United States Patent
Oga et al.

(10) Patent No.: US 9,875,824 B2
(45) Date of Patent: Jan. 23, 2018

(54) WATERPROOFING STRUCTURE, WATERPROOFING METHOD AND WIRE HARNESS

(71) Applicant: YAZAKI CORPORATION, Tokyo (JP)

(72) Inventors: Tatsuya Oga, Makinohara (JP); Hidehiko Kuboshima, Makinohara (JP); Hideomi Adachi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 50 days.

(21) Appl. No.: 14/977,967

(22) Filed: Dec. 22, 2015

(65) Prior Publication Data

US 2016/0189828 A1  Jun. 30, 2016

(30) Foreign Application Priority Data

Dec. 24, 2014 (JP) .................................. 2014-259681
Dec. 24, 2014 (JP) .................................. 2014-259682

(51) Int. Cl.
*H01B 7/282* (2006.01)
*B60R 16/02* (2006.01)
*H02G 15/013* (2006.01)
*H02G 15/04* (2006.01)

(52) U.S. Cl.
CPC ......... *H01B 7/282* (2013.01); *B60R 16/0215* (2013.01); *H02G 15/013* (2013.01); *H02G 15/04* (2013.01)

(58) Field of Classification Search
USPC ............................................ 174/72 A, 74 R
See application file for complete search history.

(56) References Cited

U.S. PATENT DOCUMENTS

| 4,126,498 A * | 11/1978 | Donecker ................ D07B 9/00 156/86 |
| 4,287,386 A * | 9/1981 | Scahill ................. H02G 15/013 174/76 |
| 4,360,704 A * | 11/1982 | Madry ................. H01B 7/2825 174/102 SC |
| 2013/0059469 A1* | 3/2013 | Kawakita ............. H02G 15/013 439/589 |
| 2013/0133946 A1* | 5/2013 | Morikawa .............. H01R 4/185 174/77 R |

(Continued)

FOREIGN PATENT DOCUMENTS

JP        2013-243900 A     12/2013

*Primary Examiner* — Chau N Nguyen
*Assistant Examiner* — Muhammed Azam
(74) *Attorney, Agent, or Firm* — Sughrue Mion, PLLC

(57) ABSTRACT

A waterproofing structure includes one or multiple insulated core wires; a shielding member configured to collectively cover the one or multiple insulated core wires; a sheath provided on the outside of the shielding member; and a waterproofing member provided at a target part of waterproofing. The target part of waterproofing is positioned where a sheath end portion is formed by cutting away the sheath to a predetermined length, and the shielding member is exposed from the sheath end portion. The waterproofing member is shaped to include a bottomed cylindrical body including a bottom portion, and one or multiple tubular portions which open up the bottom portion and continue with an outer surface of the bottom portion.

5 Claims, 17 Drawing Sheets

(56) References Cited

U.S. PATENT DOCUMENTS

2013/0183019 A1* 7/2013 Hsing .................. G02B 6/4444
385/135
2015/0041210 A1 2/2015 Inao et al.

* cited by examiner

WATERPROOFING STRUCTURE, WATERPROOFING METHOD AND WIRE HARNESS

CROSS-REFERENCES TO RELATED APPLICATIONS

This application is based on and claims priority from Japanese Patent Application Nos. 2014-259681 filed on Dec. 24, 2014 and 2014-259682 filed on Dec. 24, 2014, the entire contents of which are incorporated herein by reference.

BACKGROUND

1. Field of the Invention

The present invention relates to a waterproofing structure that includes one or multiple insulated core wires, a shielding member collectively covering the one or multiple insulated core wires, a sheath provided on the outside of the shielding member, and a waterproofing member provided on a target part of waterproofing, and to a waterproofing method. In addition, the present invention relates to a wire harness which adopts the waterproofing structure of a waterproofing structure portion.

2. Description of Related Art

As an example of a high-voltage wire harness, Patent Document 1 discloses a wire harness through which high-voltage devices mounted in a hybrid vehicle or an electric vehicle are electrically connected to each other. The wire harness disclosed in Patent Document 1 is configured to include a conductive path; a tubular exterior member which is made of resin, and accommodates and protects the conductive path; and a shielded connector provided at an end of the conductive path. The conductive path is configured to include an insulated core wire, and a shielding member covering the insulated core wire. Since the shielding member is formed on the outside of the conductive path, the shielding member is accommodated and protected by the exterior member.

The wire harness disclosed in Patent Document 1 is routed under a vehicle underfloor member. That is, the wire harness is routed along the vicinity of the ground. The exterior member made of resin is formed into a shape (a shape in which the belly of the exterior member is not cut) in which a slit extending in a tube axial direction is not present. Accordingly, even if water splashing occurs during traveling, water is not allowed to infiltrate into the exterior member. As a result, the conductive path or the shielding member is not adversely affected by water during traveling.

[Patent Document 1] JP-A-2013-243900

According to a related art, when water is collected inside of the exterior member for unknown reasons, the collected water may move up to a region in which the shielded connector is provided, that is, an electrical connection portion through a gap between the insulated core wire and the shielding member of the conductive path, which is a problem (also, when the wire harness is submerged underwater due to natural disasters, water may move up to the aforementioned portion). When a waterproofing structure portion is not provided, electrical connection of the shielded connector is adversely affected.

When a waterproofing boot is provided at a harness end of the wire harness so as to waterproof the harness end from outside water, the waterproofing boot is disposed across the shielded connector and an end portion of the exterior member (typically, the waterproofing boot is not directly attached to the shielding member). The disposition of the waterproofing boot as described above leads to an increase in the size of a portion of the wire harness in which the waterproofing boot is disposed, which is a problem. The size increase leads to a decrease in the degree of freedom in the routing of the wire harness in a vehicle.

In an example in which two conductive paths are disposed to be parallel to each other, and a cylindrical braid collectively covers the two conductive paths, a relatively large gap is formed between the two conductive paths parallel to each other, and thus it is difficult to fill up the gap at a predetermined position using an adhesive. Accordingly, satisfactory waterproofing performance cannot be obtained in a structure in which the gap is simply filled up by an adhesive, which is a problem.

In addition, when fluidity of an adhesive is not taken into consideration, the shape of the adhesive after being hardened is not stable. Therefore, even if a rubber grommet or a rubber boot is attached to the outside of the braid so as to perform waterproofing, the infiltration of water from the outside of the braid cannot be satisfactorily prevented, which is a problem. When the shape of the adhesive after being hardened is not stable, the infiltration of water from the inside of the braid cannot be satisfactorily prevented, which is a problem.

SUMMARY

The present invention provides a waterproofing structure, a waterproofing method, and a wire harness which are capable of reliably performing waterproofing at a predetermined position. In addition, the present invention provides a waterproofing structure, a waterproofing method, and a wire harness which are capable of performing waterproofing with no increase in size.

DETAILED DESCRIPTION

A waterproofing structure is a structure in which a waterproofing member is provided on a target part of waterproofing on a sheathed conductive path so as to perform waterproofing. This structure is capable of preventing the infiltration of water through a gap between an insulated core wire and a shielding member. The reason for this is that the waterproofing member is shaped to include a bottomed cylindrical body including a bottom portion, and a tubular portion which opens up the bottom portion of the body and continues outward from the bottom portion. In addition, the shielding member exposed by cutting away a portion of a sheath is folded two times at the target part of waterproofing, thereby achieving waterproofing with no deterioration in shielding performance. In addition, the tubular portion of the waterproofing member is in close contact with the insulated core wire, thereby achieving waterproofing.

A wire harness includes a waterproofing structure portion at a harness end or a harness intermediate portion. The waterproofing structure portion is configured to include two conductive paths; a cylindrical conductive braid configured to collectively cover the two conductive paths; a waterproofing plug which includes a foundation portion and a conductive path close-contact portion, and fills up a gap between the two conductive paths; a waterproofing adhesive member filling up braided meshes of the braid; and a cylindrical waterproofing grommet including an elastic close-contact portion. The waterproofing structure portion is a portion with a waterproofing structure in which the infiltration of water from the inside and the outside of the braid is prevented by the waterproofing plug, the waterproofing adhesive member, and the waterproofing grommet.

Example 1

Figure 11:
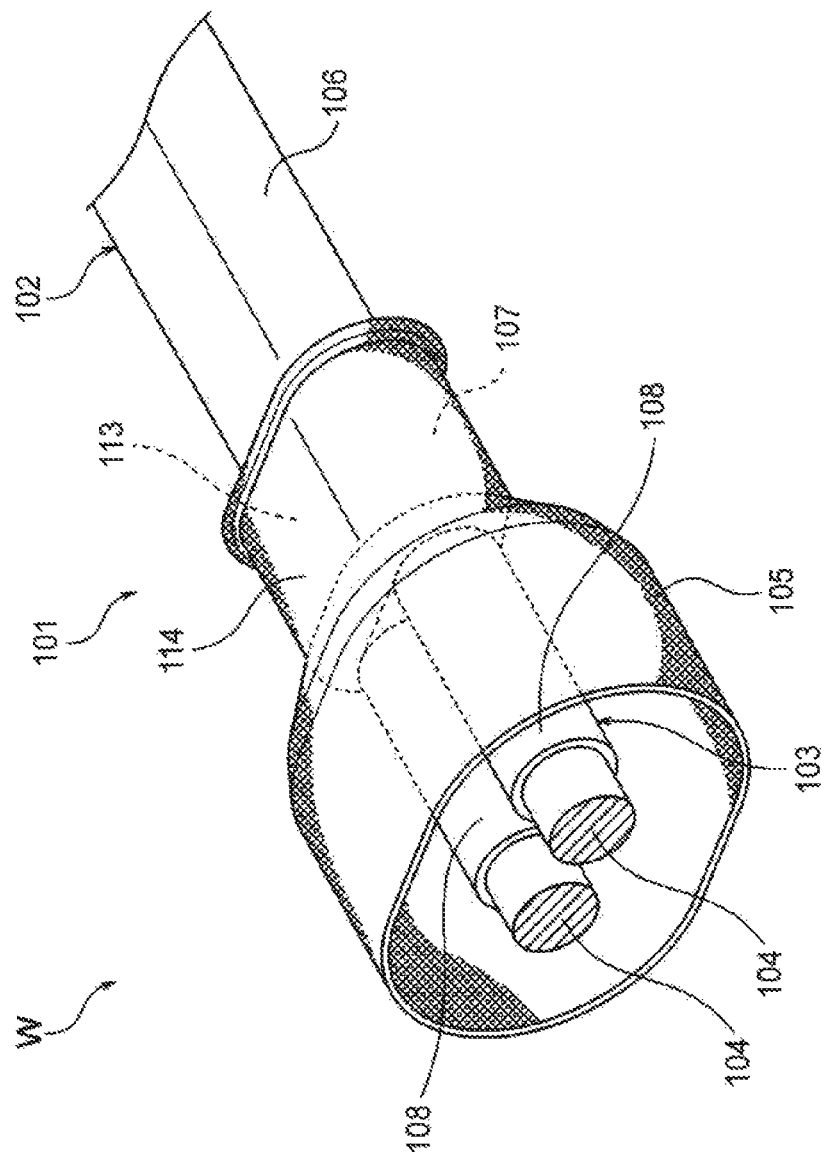
FIG. 11 is a perspective view of a waterproofing structure portion which adopts a waterproofing structure of the present invention.
Figure 12:
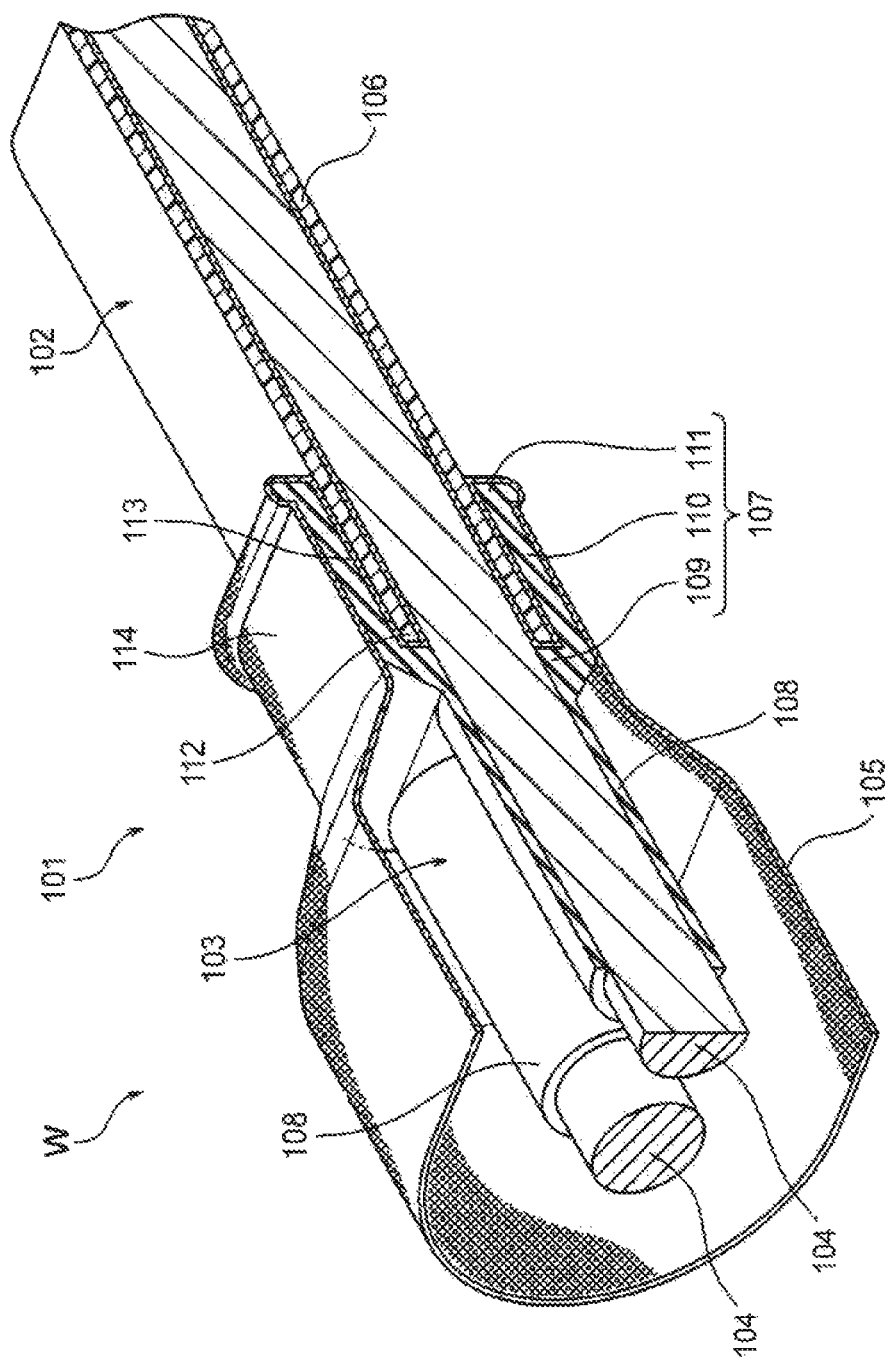
FIG. 12 is a perspective view (including a sectional view) of the waterproofing structure portion.
Figure 13:
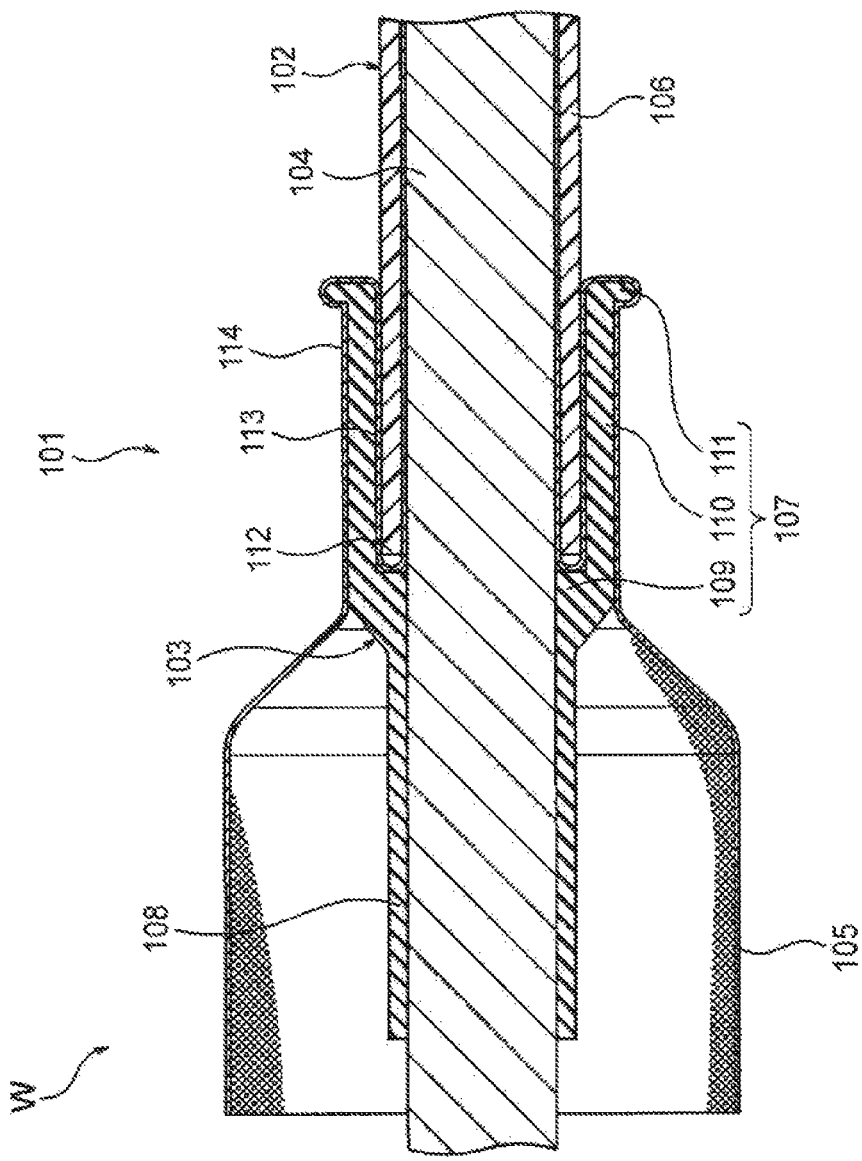
FIG. 13 is a sectional view of the waterproofing structure portion.
Figure 14:
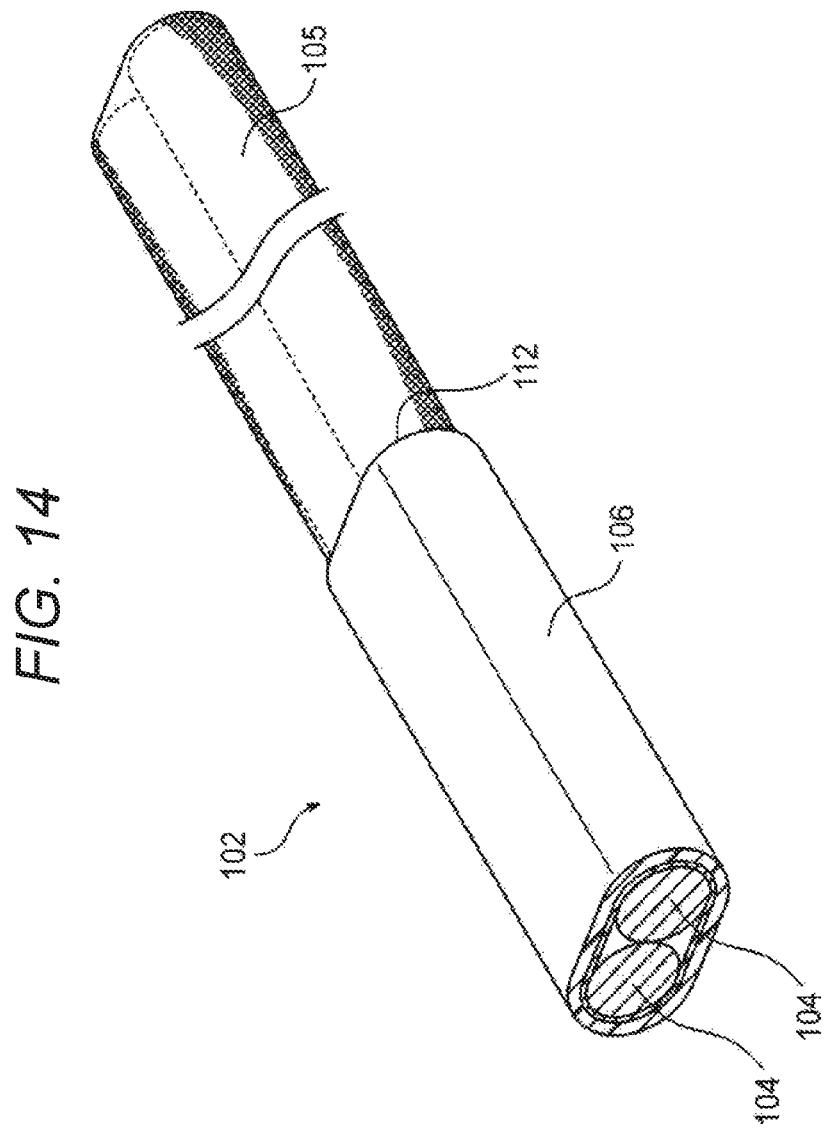
FIG. 14 is a perspective view illustrating a state in which a sheath is cut away to a predetermined length which is up to a target part of waterproofing.
Figure 15:
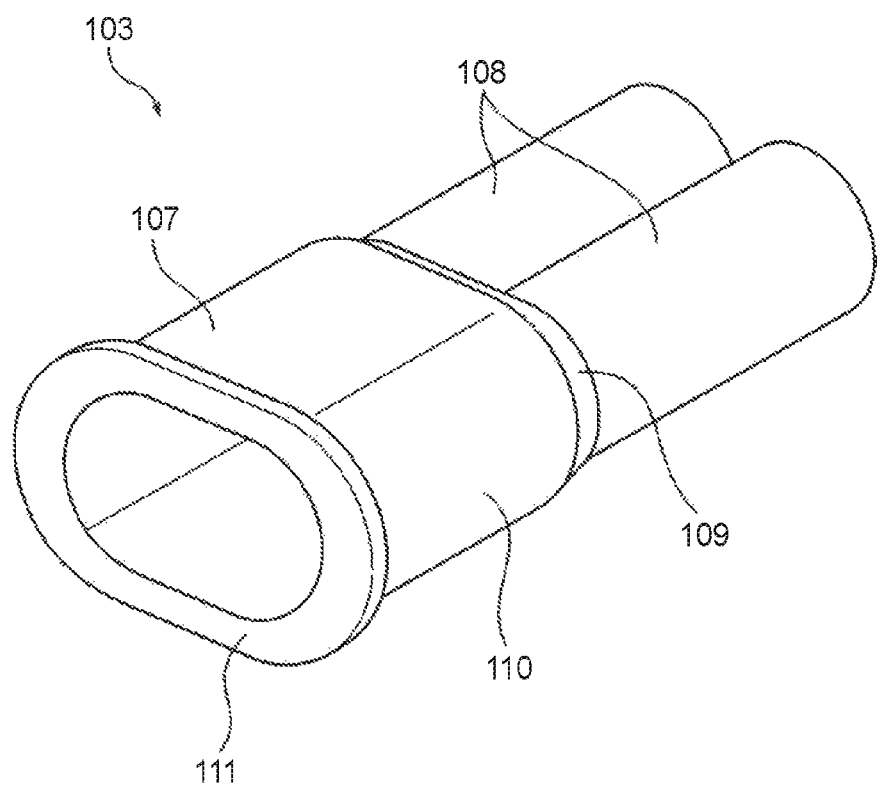
FIG. 15 is a perspective view of a waterproofing member.
Figure 16:
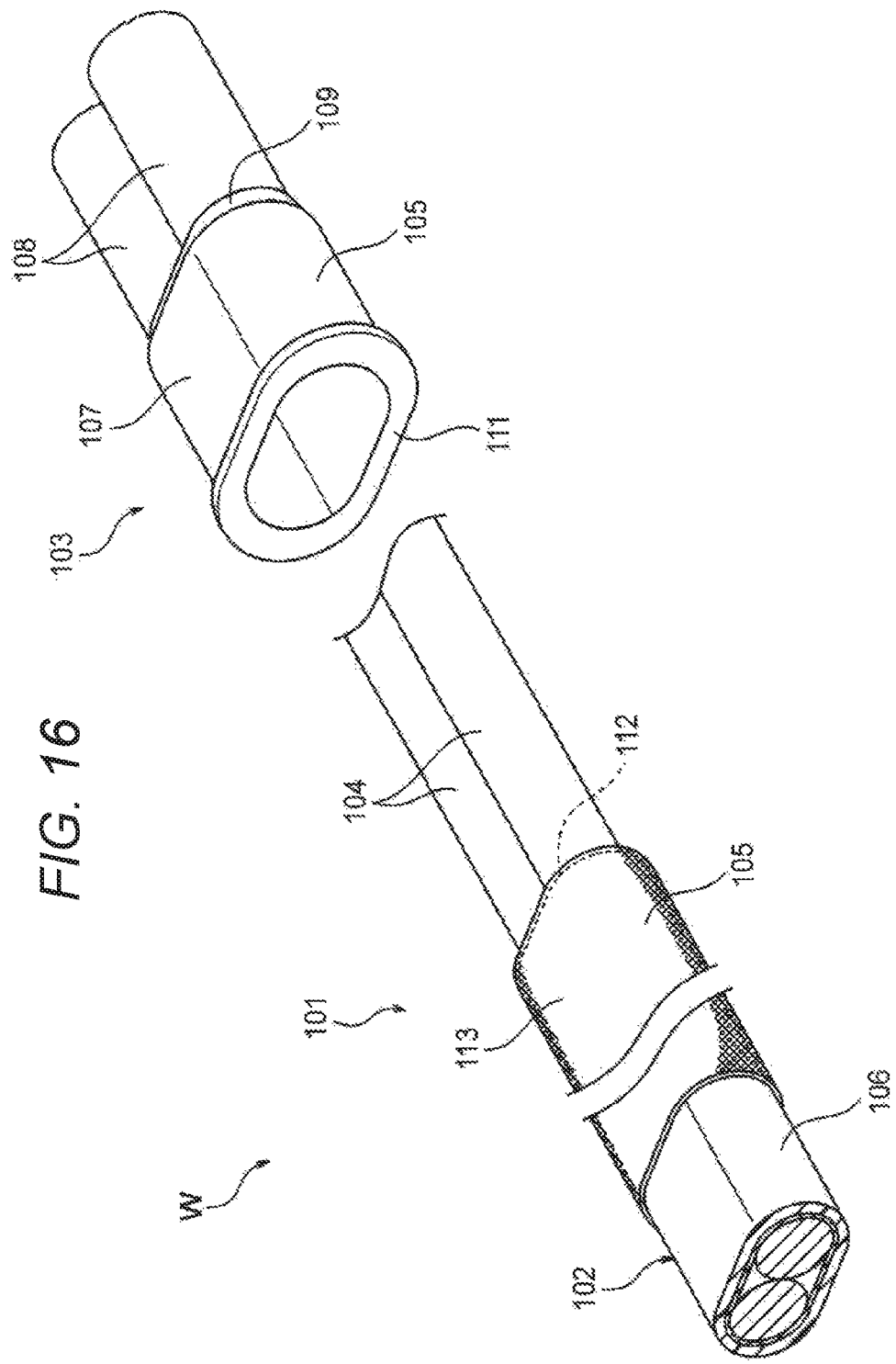
FIG. 16 is a perspective view illustrating a state in which the waterproofing member is assembled to a first folded portion.

Hereinafter, Example 1 will be described with reference to the accompanying drawings. FIG. 11 is a perspective view of a waterproofing structure portion which adopts a waterproofing structure of the present invention. FIG. 12 is a perspective view (including a sectional view) of the waterproofing structure portion. FIG. 13 is a sectional view of the waterproofing structure portion. FIG. 14 is a perspective view illustrating a state in which a sheath is cut away to a predetermined length which is up to a target part of waterproofing. FIG. 15 is a perspective view of a waterproofing member. FIG. 16 is a perspective view illustrating a state in which the waterproofing member is assembled to a first folded portion.

<Regarding Waterproofing Structure Portion 101>

In FIGS. 11 to 13, reference sign 101 represents a waterproofing structure portion provided at a desired position on a wire harness W. The waterproofing structure portion 101 is a portion which adopts a waterproofing structure of the present invention. It can be known from the following description that the waterproofing structure portion 101 is a portion structured to be capable of reliably waterproofing the target part of waterproofing. In addition, the waterproofing structure portion 101 is a portion structured to be capable of performing waterproofing with no increase in size. First, the configuration and the structure of the waterproofing structure portion 101 will be described.

The waterproofing structure portion 101 is configured to include a sheathed conductive path 102, and a waterproofing rubber boot (waterproofing member) 103 provided on the target part of waterproofing on the sheathed conductive path 102.

<Regarding Sheathed Conductive Path 102>

The sheathed conductive path 102 is configured to include two insulated core wires 104; a cylindrical conductive braid (shielding member) 105 collectively covering the two insulated core wires 104; and an insulating sheath 106 provided on the outside of the braid 105. In the sheathed conductive path 102, the braid 105 is protected by the sheath 106.

<Regarding Insulated Core Wire 104>

In FIGS. 11 to 14, the insulated core wire 104 is a high-voltage core wire, and is configured to include a conductor and an insulator (not illustrated). The conductor is made of copper, a copper alloy, aluminum, or an aluminum alloy, and has a circular sectional shape. The conductor may have either a conductor structure in which wire strands are twisted together, or a bar-shaped conductor structure (for example, a conductor structure in which the conductor is a single flat square-shaped core or a single round core, and in this case, an electrical wire also has a bar shape) in which the sectional shape of the conductor is rectangular or circular (round). The insulator made of a resin material having insulting properties is extrusion-molded over an outer surface of the conductor.

The number of insulated core wires 104 is two in this example, but is not limited to two. The number of insulated core wires 104 may be one, three, or the like.

The insulator is extrusion-molded over an outer circumferential surface of the conductor using a thermoplastic resin material. The insulator is formed as a coating having a circular sectional shape. The insulator is formed to have a predetermined thickness. Various types of well-known materials can be used as the thermoplastic resin, and for example, the material of the insulator is appropriately selected from high-polymer materials such as polyvinylchloride resin, polyethylene resin, and polypropylene resin.

<Regarding Braid 105 as Shielding Member>

The braid 105 is an electromagnetic shielding metal component (shielding member counteracting electromagnetic waves) that collectively covers the two insulated core wires 104. A well-known cylindrical braid, in which a number of metal threads are woven together, is adopted as the braid 105. The braid 105 is formed to have substantially the same length as the entire length of the two insulated core wires 104. The braid 105 has expansion and contraction properties, and is formed such that the braid 105 can be easily folded (to be described later).

<Regarding Sheath 106>

Similar to the insulator, the sheath 106 is extrusion-molded over the braid 105 using a thermoplastic resin material. The sheath 106 is formed as a coating having an oval sectional shape. The sheath 106 is formed to have a predetermined thickness. The sheath 106 is formed such that the sheath 106 is easily cut away to have a predetermined length. Various types of well-known materials can be used as the thermoplastic resin, and for example, the material of the insulator is appropriately selected from high-polymer materials such as polyvinylchloride resin, polyethylene resin, and polypropylene resin. The sheath 106 may be replaced with a well-known heat shrinkable tube.

<Regarding Waterproofing Boot 103 as Waterproofing Member>

In FIGS. 11, 12, 13, and 15, the waterproofing boot 103 is a so-called rubber boot, and is a component used for waterproofing. The waterproofing boot 103 is a component inserted into a gap between the two insulated core wires 104 and the braid 105. In addition, the waterproofing boot 103 is a component used to fill up a gap between the two insulated core wires 104. The waterproofing boot 103 is disposed to align with the position of the target part of waterproofing. In this example, a "boot" is adopted as a waterproofing member; however, a waterproofing member is not limited to a boot. That is, a "grommet" or the like may be used as a waterproofing member.

The waterproofing boot 103 includes a body 107 related to the braid 105 and the sheath 106, and two tubular portions 108 related to the two insulated core wires 104. The waterproofing boot 103 is formed into the illustrated shape. The body 107 and the two tubular portions 108 are integrally formed in the waterproofing boot 103. The entirety of the waterproofing boot 103 has elasticity.

<Regarding Each Portion of Waterproofing Boot 103>

The body 107 is formed into a bottomed cylindrical shape. Specifically, the body 107 includes an oval bottom portion 109; a cylindrical portion 110 which continues with a circumferential edge of the bottom portion 109, and has an oval sectional shape; and an opening end portion 111. The body 107 is formed into the illustrated bottomed cylindrical shape. In this example, since the sheathed conductive path 2 is configured to include the two insulated core wires 104 parallel to each other, the sheathed conductive path 2 is formed into the illustrated oval shape (when the sheathed conductive path 2 includes only one insulated core wire 104, the sheathed conductive path 2 is formed into a circular shape). The body 107 is formed to have elasticity to generate an inward biasing force.

An inner surface of the bottom portion 109 is formed into a flat surface. In contrast, an outer surface of the bottom portion 109 is formed to have a flat surface and a tapered surface. Two circular through holes are formed in the bottom portion 109. The two through holes are formed to serve as a portion of the two tubular portions 108. An inner circumferential surface of the cylindrical portion 110 is formed as a portion (portion in close contact with) in contact with a first folded portion 113 (to be described later) formed by folding the braid 105 at the position of a sheath-end portion 112 (to be described later). In contrast, an outer circumferential surface of the cylindrical portion 110 is formed as a portion covered with a second folded portion 114 (to be described later) of the braid 105. In this example, the opening end portion 111 is formed into the shape of an outward protruding flange. The opening end portion 111 is formed as a portion at which the braid 105 is folded (to be described later). The opening end portion 111 is formed into a shape which allows easy folding of the braid 105.

The tubular portion 108 is formed in a cylindrical portion of the bottom portion 109 which continues with an outer surface of the bottom portion 109. The tubular portion 108 is formed as a portion into which the insulated core wire 104 is inserted. The tubular portion 108 is formed to be in close contact with an outer circumferential surface of the insulator of the insulated core wire 104. Multiple rib portions (not illustrated) are formed on an inner circumferential surface of the tubular portion 108 to improve waterproofing performance while being spaced apart by a predetermined gap from each other. The tubular portion 108 is formed to have substantially the same length as that of the body 107.

<Regarding Waterproofing Method>

Hereinafter, the assembling of the waterproofing structure portion 101 will be described with reference to FIGS. 11 to 13, 14, and 16. That is, a waterproofing method will be described. In this example, the following first to fourth steps are sequentially performed in the waterproofing method.

<First Step>

In the first step illustrated in FIG. 14, the sheath 106 is cut away to a predetermined length which is up to the target part of waterproofing. When this operation is performed, the sheath-end portion 112 is formed in the sheath 106, and the braid 105 is exposed from the sheath-end portion 112.

<Second Step>

In the second step illustrated in FIG. 16, the braid 105 is folded at the position of the sheath-end portion 112 toward the sheath 106. When this operation is performed, the first folded portion 113, which is a first folded portion of the braid 105, is formed. The two insulated core wires 104 are exposed by forming the first folded portion 113.

<Third Step>

In the third step, the waterproofing boot 103 is assembled in such a way as to be aligned with the target part of waterproofing. When this operation is performed, an inner circumferential surface of the body 107 is in close contact with the first folded portion 113. The two insulated core wires 104 are inserted into, and come into close contact with the tubular portions 108, respectively. When the tubular portions 108 respectively come into close contact with the outer circumferential surfaces of the insulators of the insulated core wires 104, water is not capable of infiltrating and passing through a gap between the two insulated core wires 104 and the braid 105, thereby achieving waterproofing. Waterproofing is also performed by the provision of the bottom portion 109.

<Fourth Step>

In the fourth step, the braid 105 is folded at the position of the opening end portion 111 of the body 107 toward the two exposed insulated core wires 104. When this operation is performed, the second folded portion 114, which is a second folded portion of the braid 105, is formed. An outer circumferential surface of the body 107 is covered with the braid 105 by forming the second folded portion 114. That is, shielding performance for the two insulated core wires 104 exposed up to this point in time is ensured.

As described above, the infiltration of water through the gap between the two insulated core wires 104 and the braid 105 is prevented by the bottom portion 109 and the tubular portions 108. Since biasing force brings the body 107 into close contact with the braid 105, even if water makes a U-turn due to the waterproofed portions, and infiltrates through a gap between an outer circumferential surface of the sheath 106 and the braid 105 (the first folded portion 113) and/or a gap between the braid 105 (the first folded portion 113) and the inner circumferential surface of the body 107, the gaps are waterproofed.

<Regarding Effects of Waterproofing Structure Portion 101>

As described with reference to FIGS. 11 to 16, the waterproofing structure portion 101 of the present invention is a structure in which the waterproofing boot 103 is provided on the target part of waterproofing on the sheathed conductive path 102 so as to perform waterproofing. This structure is capable of preventing the infiltration of water through the gap between the two insulated core wires 104 and the braid 105. The reason for this is that the waterproofing boot 103 is shaped to include the bottomed cylindrical body 107 including the bottom portion 109, and the two tubular portions 108 which open up the bottom portion 109 of the body 107 and continue outward from the bottom portion 109. In addition, the braid 105 exposed by cutting away a portion of the sheath 106 is folded two times at the target part of waterproofing, thereby achieving waterproofing with no deterioration in shielding performance. In addition, the tubular portions 108 of the waterproofing boot 103 are in close contact with the insulated core wires 104, thereby achieving waterproofing.

Accordingly, the waterproofing structure portion 101 of the present invention is capable of performing waterproofing at a predetermined location. As can be known from the waterproofing structure portion 101 of the present invention, waterproofing can be achieved with no increase in size.

The waterproofing structure portion 101 is a small structure, and thus the degree of freedom in the mounting of the waterproofing structure portion 101 in a vehicle can be increased. Since the configuration and the structure are simple, the waterproofing structure portion 101 can be supplied at a low price.

<Regarding Routing State of Wire Harness W>

Hereinafter, a routing state of a wire harness W, in which the waterproofing structure portion 101 of the present invention is provided, will be described with reference to FIGS. 17A and 17B.

Figure 17A:
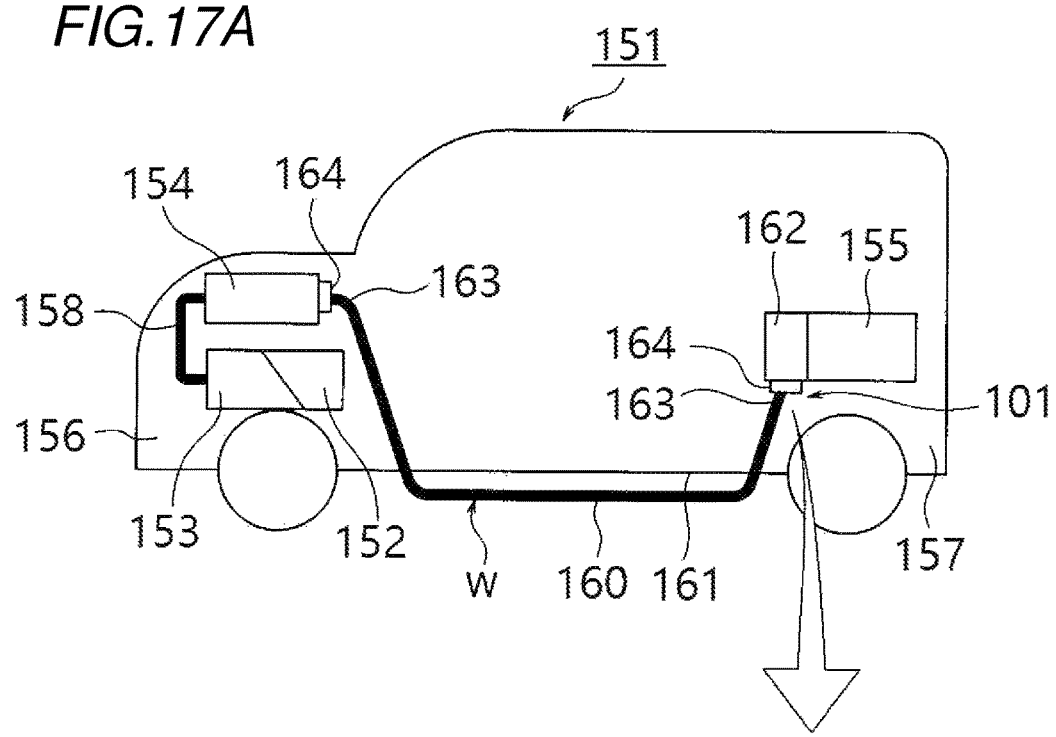
FIG. 17A is a schematic view illustrating a routing state of a wire harness of the present invention.
Figure 17B:
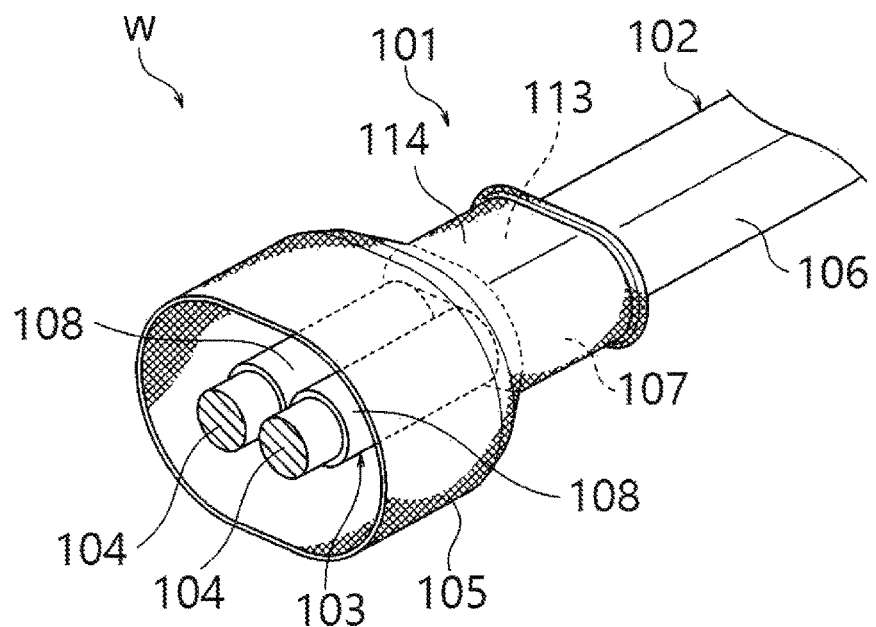
FIG. 17B is a schematic view illustrating a routing state of a wire harness of the present invention.

In FIG. 17A, reference sign 151 represents a hybrid vehicle. The hybrid vehicle 151 is a vehicle driven by driving power from a combination of two power sources, that is, an engine 152 and a motor unit 153. Electrical power is supplied from a battery 155 (battery cell pack) to the motor unit 153 via an inverter unit 154. In this example, the engine 152, the motor unit 153, and the inverter unit 154 are mounted in an engine compartment 156 in the vicinity of the front wheels and the like. The battery 155 is mounted in a vehicle rear portion 157 in the vicinity of the rear wheels and the like (the battery 155 may be mounted in a vehicle interior that is present on a rear side of the engine compartment 156).

The motor unit 153 is connected to the inverter unit 154 via a high-voltage wire harness 158. The battery 155 is connected to the inverter unit 154 via the high-voltage wire harness W. An intermediate portion 160 of the wire harness W is routed under a vehicle underfloor member 161 of the vehicle (a vehicle body). The intermediate portion 160 is routed parallel to and along the vehicle underfloor member 161. The vehicle underfloor member 161 is a well-known body (vehicle body), and a so-called panel member. Through holes are respectively formed at predetermined positions in the vehicle underfloor member 161. The wire harness W is water-tightly inserted into the through holes.

The wire harness W is connected to the battery 155 via a junction block 162 provided in the battery 155. External connecting means such as a shielded connector 164 is provided at a harness end 163 on a rear end side of the wire harness W, and is electrically connected to the junction block 162. The wire harness W is electrically connected to the inverter unit 154 via the external connecting means such as the shielded connector 164 provided at the harness end 163 on a front end side of the wire harness W.

The waterproofing structure portion 101 of the present invention is disposed at the position of the harness end 163 on the rear end side of the wire harness W (the position for the disposition is an example, and a waterproofing grommet may be replaced with the waterproofing boot 103, and the waterproofing structure portion 101 of the present invention may be disposed to align with the position of the through hole).

Example 2

Figure 1:
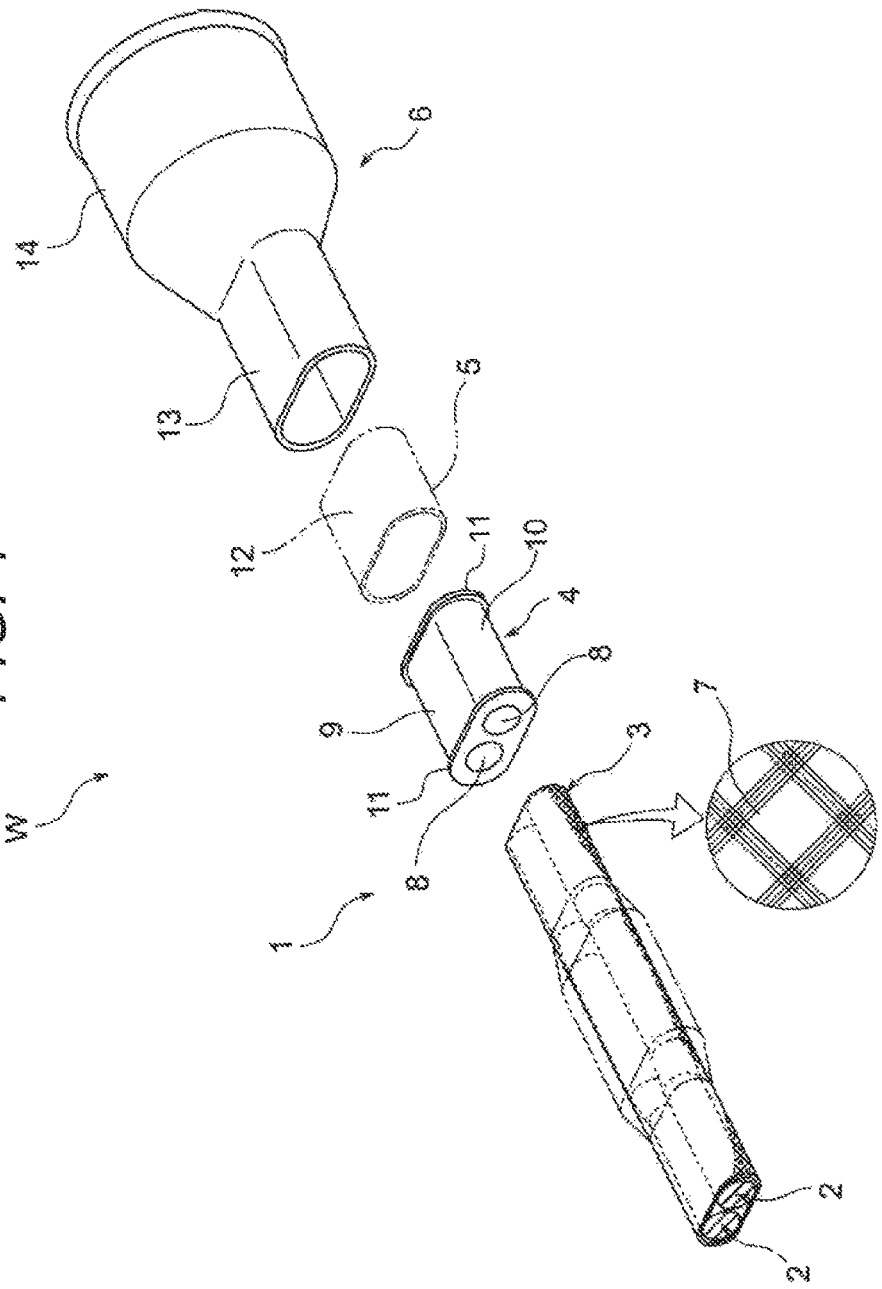
FIG. 1 is an exploded perspective view of a waterproofing structure portion which adopts a waterproofing structure of the present invention.
Figure 2:
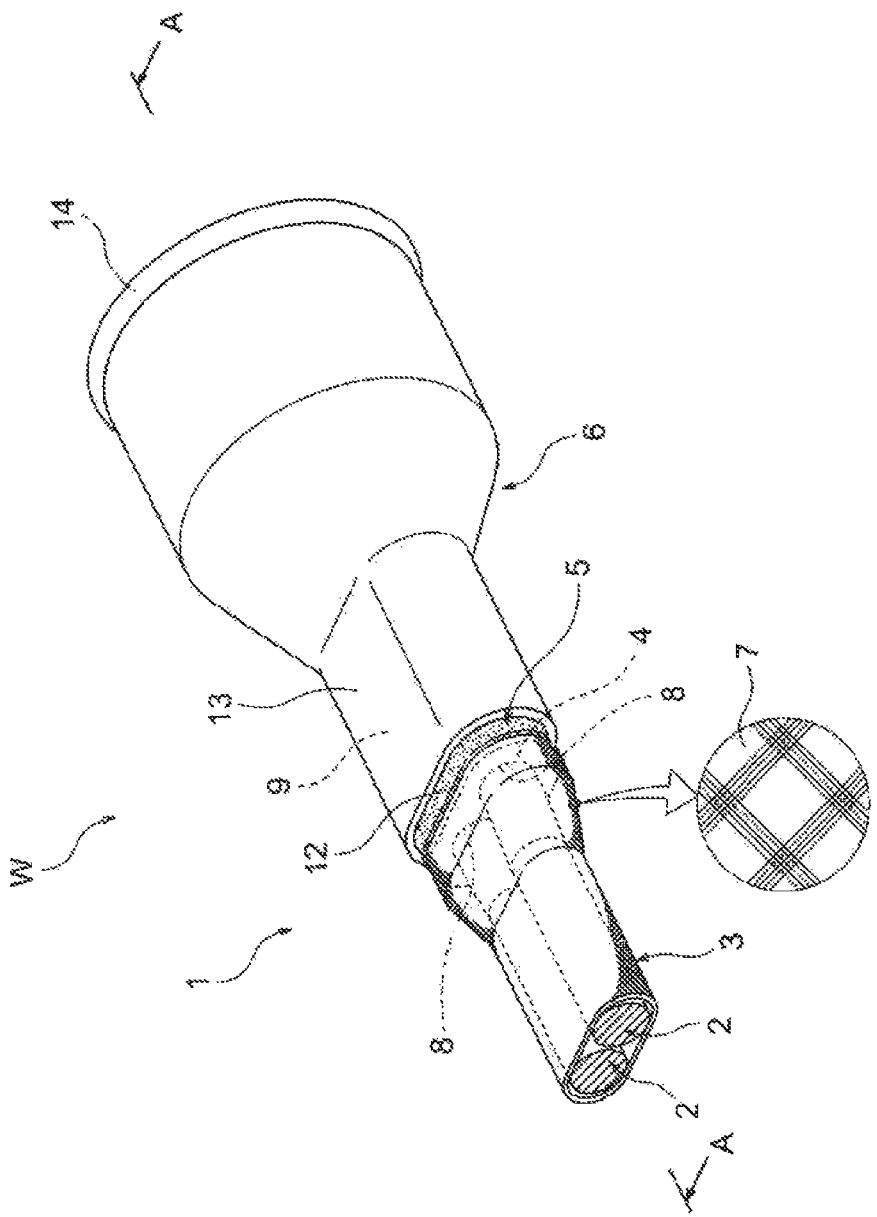
FIG. 2 is a perspective view of the waterproofing structure portion in FIG. 1.
Figure 3:
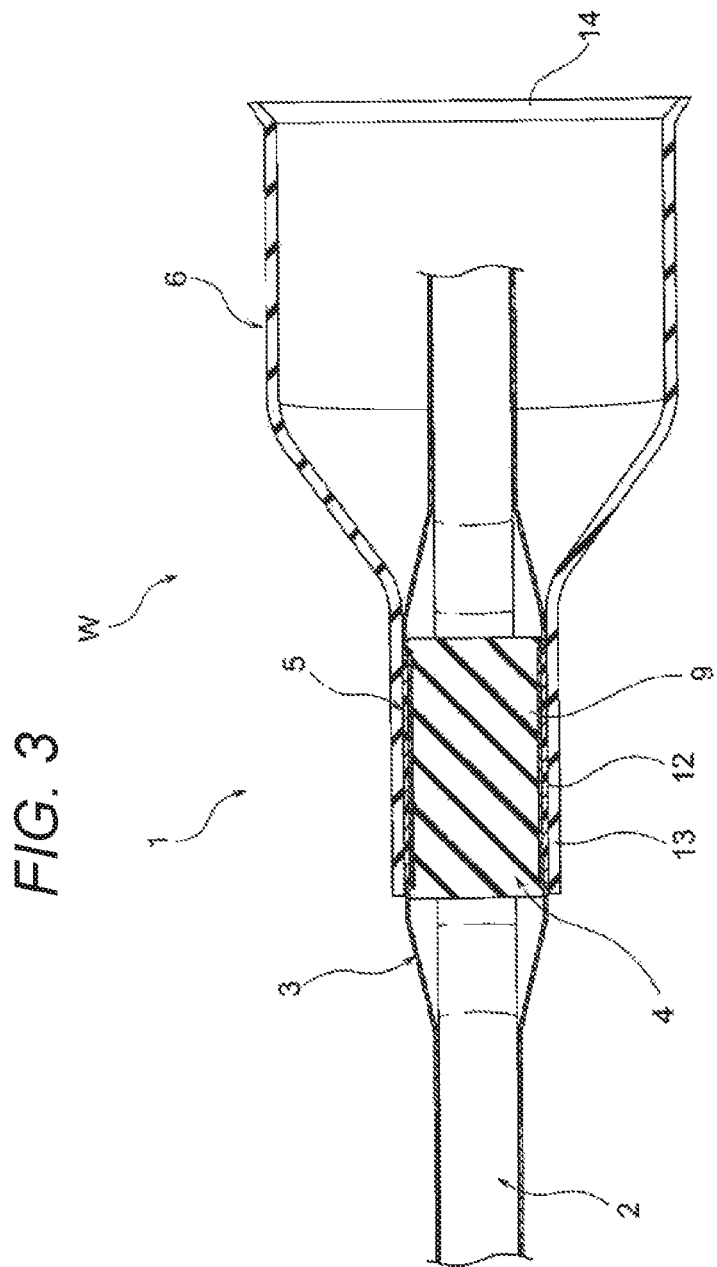
FIG. 3 is a sectional view of the waterproofing structure portion taken along line A-A in FIG. 2.
Figure 4:
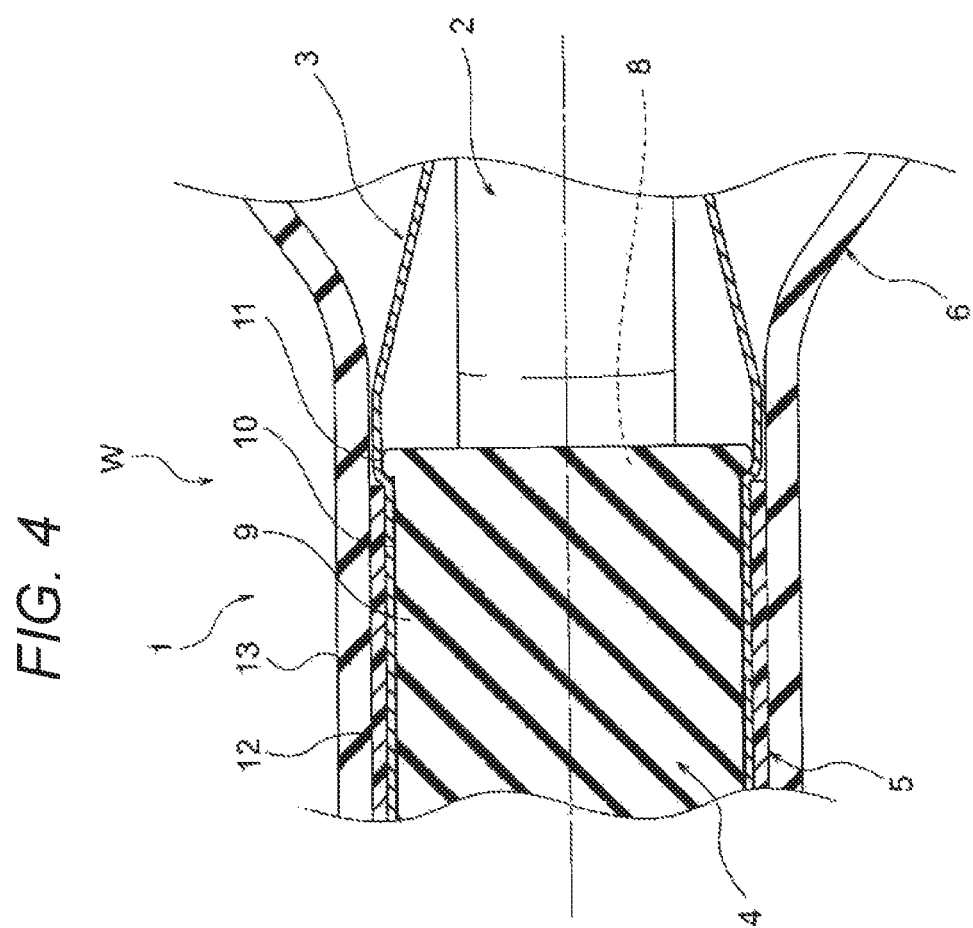
FIG. 4 is an enlarged view of an essential portion in FIG. 3.

Hereinafter, Example 2 will be described with reference to the accompanying drawings. FIG. 1 is an exploded perspective view of a waterproofing structure portion which adopts a waterproofing structure of the present invention. FIG. 2 is a perspective view of the waterproofing structure portion in FIG. 1. FIG. 3 is a sectional view of the waterproofing structure portion taken along line A-A in FIG. 2. FIG. 4 is an enlarged view of an essential portion in FIG. 3. FIGS. 5 to 9 are views illustrating each step of a waterproofing method of the present invention.

<Regarding Configuration of Waterproofing Structure Portion 1>

In FIGS. 1 to 3, reference sign 1 represents a waterproofing structure portion provided at a desired position on the wire harness W. The waterproofing structure portion 1 is a portion which adopts the waterproofing structure of the present invention. It can be known from the following description that the waterproofing structure portion 1 is a portion structured to be capable of reliably waterproofing a target part of waterproofing. First, the configuration and the structure of the waterproofing structure portion 1 will be described.

The waterproofing structure portion 1 is configured to include two conductive paths 2; a cylindrical conductive braid (shielding member) 3 collectively covering the two conductive paths 2; a waterproofing rubber plug (first waterproofing means) 4; a waterproofing adhesive member (second waterproofing means) 5 filling up braided meshes 7 (to be described later) of the braid; and a waterproofing rubber grommet (third waterproofing means) 6.

<Regarding Conductive Path 2>

The conductive path 2 is a high-voltage conductive path, and is configured to include a conductor and an insulator (not illustrated). The conductor is made of copper, a copper alloy, aluminum, or an aluminum alloy, and has a circular sectional shape. The conductor may have either a conductor structure in which wire strands are twisted together, or a bar-shaped conductor structure (for example, a conductor structure in which the conductor is a single flat square-shaped core or a single round core, and in this case, an electrical wire also has a bar shape) in which the sectional shape of the conductor is rectangular or circular (round). The insulator made of a resin material having insulting properties is extrusion-molded over an outer surface of the conductor.

In this example, the conductive path 2 adopts the configuration of a well-known high-voltage electrical wire; however, the configuration is not limited to that in this example. That is, a high-voltage circuit, in which an insulator is provided over the surface of a well-known busbar, may be adopted. The number of conductive paths 2 is two in this example, but is not limited to two. The number of conductive paths 2 may be three or the like.

The insulator is extrusion-molded over an outer circumferential surface of the conductor using a thermoplastic resin material. The insulator is formed as a coating having a circular sectional shape. The insulator is formed to have a predetermined thickness. Various types of well-known materials can be used as the thermoplastic resin, and for example, the material of the insulator is appropriately selected from high-polymer materials such as polyvinylchloride resin, polyethylene resin, and polypropylene resin.

<Regarding Braid 3 as Shielding Member>

The braid 3 is an electromagnetic shielding metal component (shielding member counteracting electromagnetic waves) that collectively covers the two conductive paths 2. A well-known cylindrical braid, in which a number of metal threads are woven together, is adopted as the braid 3. A large number of the braided meshes (inner-to-outer surface communication portions) 7 are formed in the braid 3. The braided mesh 7 is formed as a substantially gap-like portion through which an inner surface and an outer surface of the braid 3 communicate with each other. Insofar as the braid 3 can be provided with substantially gap-like portions, a shielding member other than the braid 3 may be adopted (for example, equivalent to a case in which substantially gap-like portions are formed by wrapping conductive metal foil tape or tape that is obtained by providing metal foil on a base material). The braid 3 is formed to have substantially the same length as the entire length of the two conductive paths 2. The braid 3 has expansion and contraction properties, and is formed such that the braid 3 can be easily rolled up (to be described later).

<Regarding Waterproofing Plug 4 as First Waterproofing Means>

The waterproofing plug 4 is a so-called rubber plug, and is a component used for waterproofing. The waterproofing plug 4 is a component inserted into or mounted in a gap between the two conductive paths 2 and the braid 3. The waterproofing plug 4 is a component used to fill up a gap between the two conductive paths 2. Insofar as the waterproofing plug 4 is capable of reliably filling put the gap between the two conductive paths 2, and forming a portion with the same function as that of a foundation portion 9 (to be described later), the waterproofing plug 4 is not limited to a rubber plug. The waterproofing plug 4 is disposed to align with the position of the target part of waterproofing.

The waterproofing plug 4 includes two conductive path close-contact portions 8, and the foundation portion 9. The waterproofing plug 4 is formed into the illustrated shape. More specifically, in this example, the waterproofing plug 4 is formed into the shape of a rubber lump having an oval sectional shape and extending a predetermined length. Two through holes are formed in the rubber lump in such a way as to extend perfectly straight in an axial direction. The two through holes are the conductive path close-contact portions 8, and the conductive path close-contact portions 8 are disposed to respectively align with the positions of the two conductive paths 2. An external portion (particularly, outer circumferential portion) of the rubber lump is formed as the foundation portion 9.

<Regarding Each Portion of Waterproofing Plug 4>

The conductive path close-contact portion 8 is formed as a portion coming into close contact with an outer surface of the insulator of the conductive path 2. The conductive path 2 is waterproofed due to close contact between the conductive path close-contact portion 8 and the outer surface of the insulator. In this example, the conductive path close-contact portion 8 is formed in order for the conductive path 2 to be inserted thereinto; however, the shape of the conductive path close-contact portion 8 is not limited to that in this example. That is, the waterproofing plug 4 may be shaped in such a manner that a slit is formed up to the outer circumferential surface of the waterproofing plug 4, and the conductive paths 2 are mounted in the waterproofing plug 4 in a state where the slit is opened up (after the conductive paths 2 are mounted, the slit may be closed).

Multiple rib portions (not illustrated) are formed as sealing portions in the conductive path close-contact portion 8. The rib portion is a portion provided to improve waterproofing properties, and is formed into an annular shape having a mountain-like sectional shape. As described above, the conductive path 2 is waterproofed by the conductive path close-contact portion 8. The gap between the two conductive paths 2 parallel to each other is filled up and waterproofed by the waterproofing plug 4.

An outer circumferential surface 10 is formed in the foundation portion 9 so as to receive and come into close contact with an inner surface of the braid 4. In addition, the outer circumferential surface 10 is formed in the foundation portion 9 so as to come into close contact with the waterproofing adhesive member 5. That is, the waterproofing plug 4 is formed as a foundation (base) for the inner surface of the braid 4 or the waterproofing adhesive member 5 so as to be able to stabilize the shape thereof. The outer circumferential surface 10 of the foundation portion 9 is formed to be smooth.

Annular ribs 11 are respectively formed at both ends of the foundation portion 9. The rib 11 is formed as a protruding portion with which the outer circumferential surface 10 is fringed. The rib 11 is formed to have such a height that the rib 11 slightly protrudes from the outer circumferential surface 10. Even if the waterproofing adhesive member 5 contains a silicone material or a butyl material, and has fluidity, the rib 11 is formed so as to contribute to limitation of the flowing thereof. The rib 11 is formed into a shape suitable for the waterproofing adhesive member 5.

<Regarding Waterproofing Adhesive Member 5 as Second Waterproofing Means>

In FIGS. 2 and 4, the material of the waterproofing adhesive member 5 is adopted such that the waterproofing adhesive member 5 can be provided on the outer surface of the braid 3 to come into close contact with the outer surface, and is capable of filling up the braided meshes 7 of the braid 3. The material of the waterproofing adhesive member 5 is adopted such that the waterproofing adhesive member 5 is capable of forming a waterproofing means outer surface 12 on an outer surface side of the braid 3. Specifically, a waterproofing material (adhesive or the like), a heat shrinkable tube including a waterproofing material on an inner surface of the heat shrinkable tube, waterproofing tape, or the like is adopted as the material of the waterproofing adhesive member 5. In this example, a well-known hot melt adhesive (adhesive which is melted by heat to bond target components together) is adopted as the aforementioned adhesive (insofar as the adhesive demonstrates equivalent adhesive performance, the adhesive is not limited to a specific type).

Similar to the waterproofing plug 4, the waterproofing adhesive member 5 is disposed to align with the position of the target part of waterproofing. The waterproofing adhesive member 5 is disposed at a position in which the waterproofing adhesive member 5 overlaps the foundation portion 9 of the waterproofing plug 4 and the braid 3.

A gap between the braid 3 and the waterproofing plug 4 is waterproofed by the waterproofing adhesive member 5. A gap between the braid 3 and the two conductive paths 2 is waterproofed by the waterproofing plug 4 and the waterproofing adhesive member 5.

<Regarding Waterproofing Means Outer Surface 12>

The waterproofing means outer surface 12 is an outer surface which is formed when an adhesive portion of the waterproofing adhesive member 5 is hardened (when the waterproofing adhesive member 5 includes a tube base material or a tape base material, the waterproofing means outer surface 12 is equivalent to an outer surface of the base material). The waterproofing means outer surface 12 is formed on the outer surface side of the braid 3, and comes into close contact with the waterproofing grommet 6. The waterproofing means outer surface 12 is formed to be smooth.

<Regarding Waterproofing Grommet 6 as Third Waterproofing Means>

In FIGS. 1 to 4, the waterproofing grommet 6 is a cylindrical rubber component used for waterproofing. The waterproofing grommet 6 has elasticity. The waterproofing grommet 6 includes an elastic close-contact portion 13, and a fixed portion 14 which continues with the elastic contacting portion 13. In this example, a so-called grommet is adopted as the third waterproofing means; however, the third waterproofing means is not limited to a grommet, and for example, a waterproofing boot may be adopted as the third waterproofing means. As an example, an adopted waterproofing boot is configured to cover the shielded connector at the harness end.

<Regarding Each Portion of Waterproofing Grommet 6>

The elastic close-contact portion 13 is formed as a portion which comes into close contact with the waterproofing means outer surface 12 of the waterproofing adhesive member 5 from the outside of the waterproofing adhesive member 5. The elastic close-contact portion 13 is formed as a portion having elasticity to bias the waterproofing means outer surface 12 inward when the elastic close-contact portion 13 is attached to the waterproofing means outer surface 12.

The fixed portion 14 is formed as a portion fixed to a mating member (not illustrated) such as a vehicle body panel. The elastic close-contact portion 13 is formed to have an oval sectional shape, and in contrast, the fixed portion 14 is formed into a bulged shape having a circular sectional shape. The fixed portion 14 is formed to have a gap between the braid 3 and the fixed portion 14. The fixed portion 14 is formed to cover an outer circumference of the braid 3. An end portion of the fixed portion 14 is fixed to the mating member (not illustrated), which is not illustrated in detail.

<Regarding Waterproofing Method>

Hereinafter, the assembling of the waterproofing structure portion 1 will be described with reference to FIGS. 5 to 9. That is, a waterproofing method will be described. In this example, the following first to fourth steps are sequentially performed in the waterproofing method.

<First Step>

Figure 5:
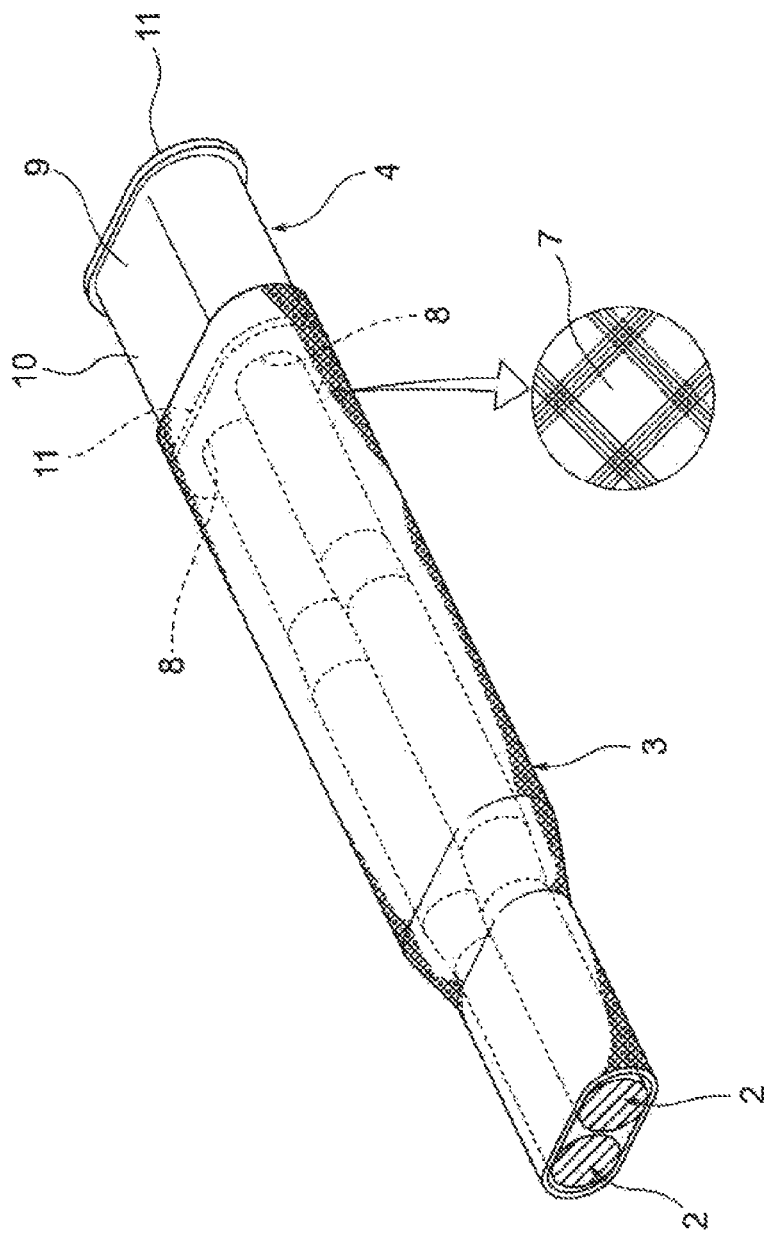
FIG. 5 is a view illustrating a first step of a waterproofing method of the present invention.

In the first step illustrated in FIG. 5, the braid 3 is rolled up in such a way as to be aligned with a target part of waterproofing (or the diameter of the braid 3 is widened so as to allow the insertion of the waterproofing plug 4). When this operation is performed, the two conductive paths 2 are exposed up to the target part of waterproofing. Thereafter, the waterproofing plug 4 is assembled to the two exposed conductive paths 2. When the waterproofing plug 4 is assembled thereto, the gap between the two conductive paths 2 is filled up by the waterproofing plug 4. That is, the gap between the conductive paths 2 is waterproofed by the waterproofing plug 4. When the waterproofing plug 4 is assembled thereto, the two conductive paths 2 are respectively waterproofed by the conductive path close-contact portions 8 formed in the waterproofing plug 4.

<Second Step>

Figure 6:
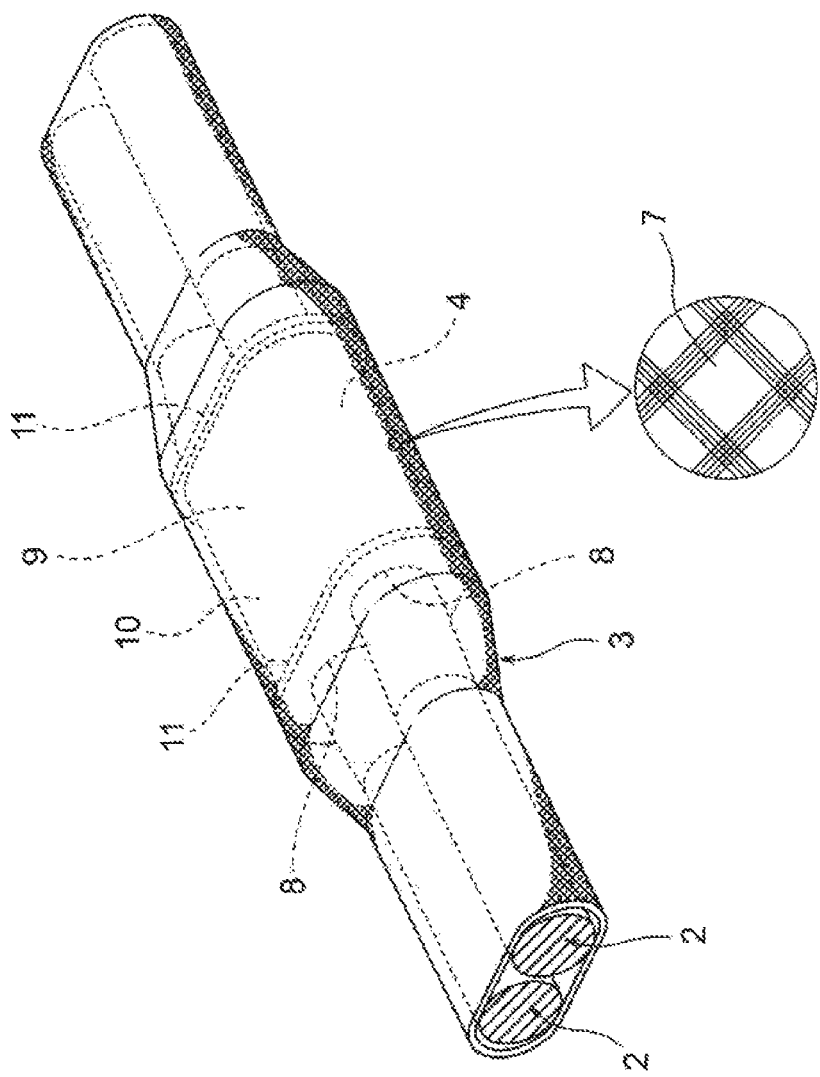
FIG. 6 is a view illustrating a second step of the waterproofing method of the present invention.

In the second step illustrated in FIG. 6, the braid 3 rolled up in the first step is restored to its original state. When this operation is performed, and the braid 3 is restored to its original state, the waterproofing plug 4 together with the two conductive paths 2 are covered with the braid 3.

<Third Step>

Figure 7:
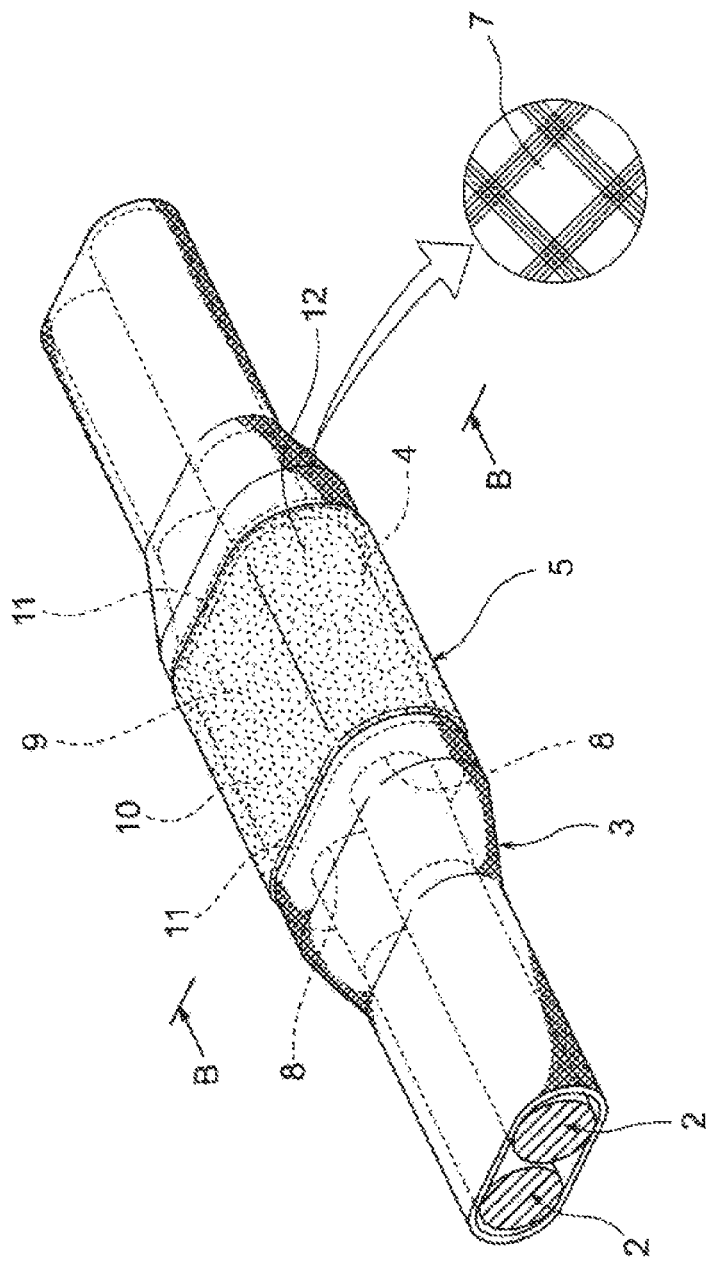
FIG. 7 is a view illustrating a third step of the waterproofing method of the present invention.
Figure 8:
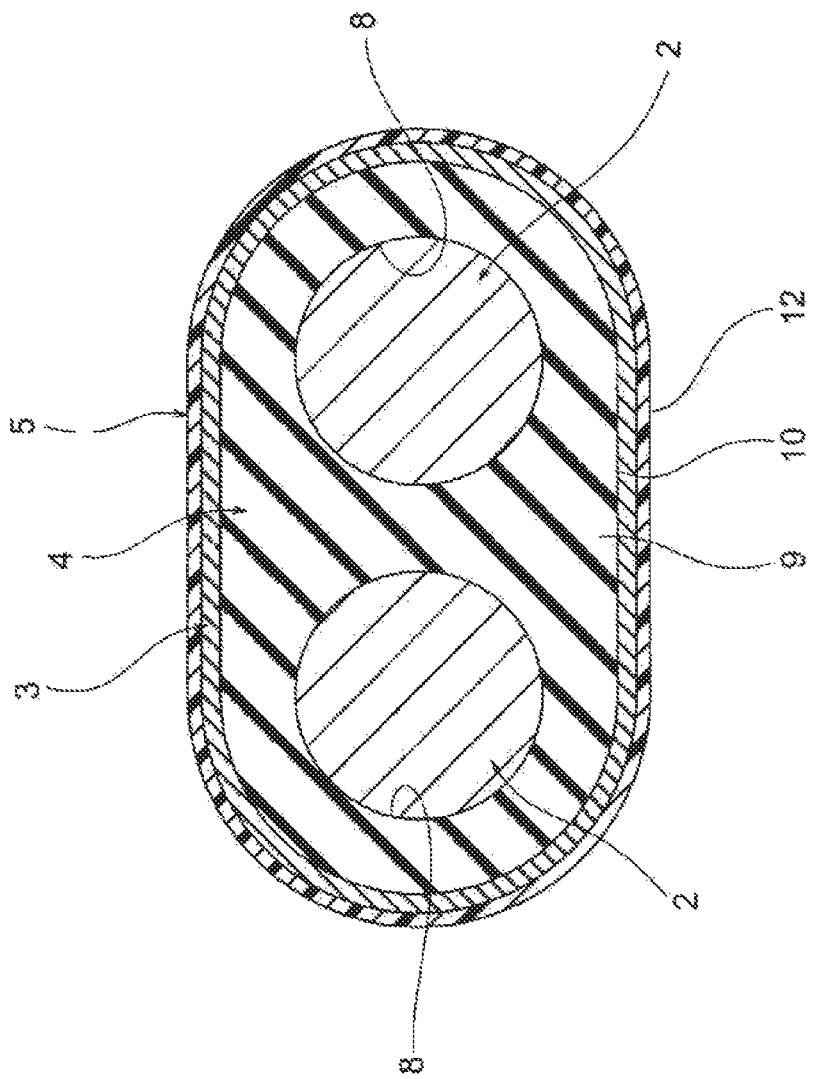
FIG. 8 is a sectional view of the waterproofing structure portion taken along line B-B in FIG. 7.

In the third step illustrated in FIGS. 7 and 8, the waterproofing adhesive member 5 is provided on the outer surface of the braid 3 in such a way as to be aligned with the target part of waterproofing. In this example, the waterproofing adhesive member 5, which is melted by heat, and then is hardened, is adopted.

When the third step is performed, the waterproofing adhesive member 5 infiltrates into and fills up the braided meshes 7 of the braid 3, and reaches the foundation portion 9 of the waterproofing plug 4. Thereafter, when the waterproofing adhesive member 5 is hardened, the hardened waterproofing adhesive member 5 completely comes into close contact with the foundation portion 9. At this time, the inner surface of the braid 3 also comes into close contact with the foundation portion 9 along with the waterproofing adhesive member 5 (refer to FIG. 4). When the waterproofing adhesive member 5 is hardened, the waterproofing means outer surface 12 is formed on the outer surface side of the braid 3.

<Fourth Step>

Figure 9:
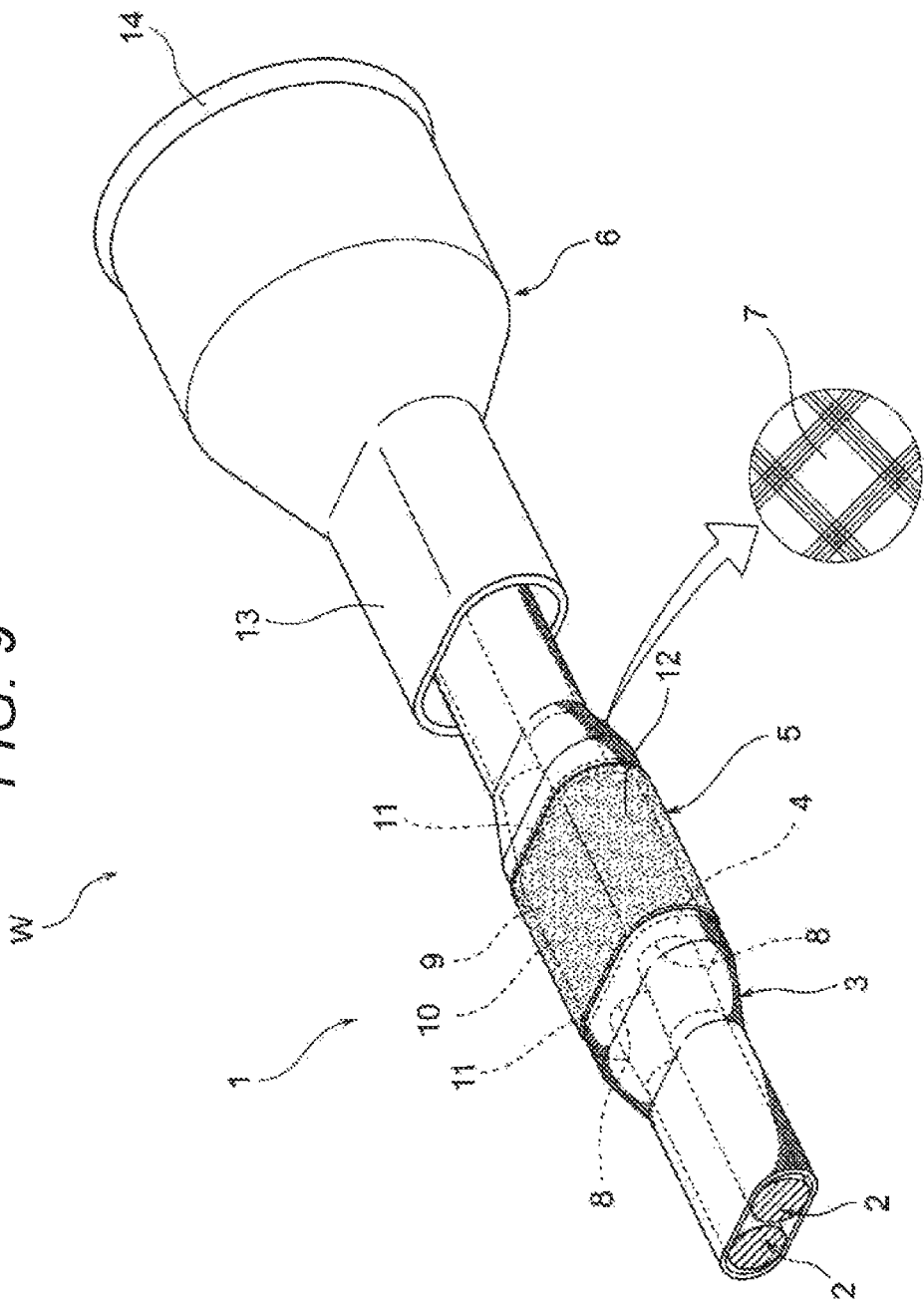
FIG. 9 is a view illustrating a fourth step of the waterproofing method of the present invention.

In the fourth step illustrated in FIG. 9, the elastic close-contact portion 13 of the waterproofing grommet 6 is brought into close contact with the waterproofing means outer surface 12 formed on the outer surface side of the braid 3 by the hardening of the waterproofing adhesive member 5. When this operation is performed, the braid 3 is also waterproofed by the waterproofing grommet 6.

<Operation and Effects of Waterproofing Structure Portion 1>

As described with reference to FIGS. 1 to 9, in the waterproofing structure portion 1 of the present invention, the waterproofing plug 4 is disposed at the target part of waterproofing on the two conductive paths 2. Therefore, the gap between the two conductive paths 2 can be filled up and waterproofed by the waterproofing plug 4. The conductive paths 2 can be waterproofed by the conductive path close-contact portions 8 formed in the waterproofing plug 4.

In the waterproofing structure portion 1 of the present invention, the waterproofing adhesive member 5 is disposed on the outer surface of the braid 3 in such a way as to be aligned with the target part of waterproofing. Therefore, the braided meshes 7 of the braid 3 can be filled up and waterproofed. Since the waterproofing adhesive member 5 comes into close contact with the foundation portion 9 of the waterproofing plug 4 positioned on an inner surface side of the braid 3 in addition to filling up the braided meshes 7, the inner surface of the braid 3 comes into close contact with the foundation portion 9. Accordingly, the gap between the braid 3 and the two conductive paths 2 can be waterproofed by the waterproofing plug 4 and the waterproofing adhesive member 5.

In the waterproofing structure portion 1 of the present invention, the waterproofing grommet 6 is disposed in such a way as to be aligned with the target part of waterproofing, and thus the braid 3 can be waterproofed by bring the waterproofing grommet 6 into close contact with the waterproofing means outer surface 12 formed on the outer surface side of the braid 3.

As such, the waterproofing structure portion 1 of the present invention is capable of reliably performing waterproofing at a predetermined position.

As can be known from the waterproofing structure portion 1 of the present invention, the waterproofing structure portion 1 is a small structure, and thus the degree of freedom in the mounting of the waterproofing structure portion 1 in a vehicle can be increased. Since the configuration and the structure are simple, the waterproofing structure portion 1 can be supplied at low prices.

<Regarding Routing State of Wire harness W>

Hereinafter, a routing state of the wire harness W, in which the waterproofing structure portion 1 of the present invention is provided, will be described with reference to FIGS. 10A and 10B.

Figure 10A:
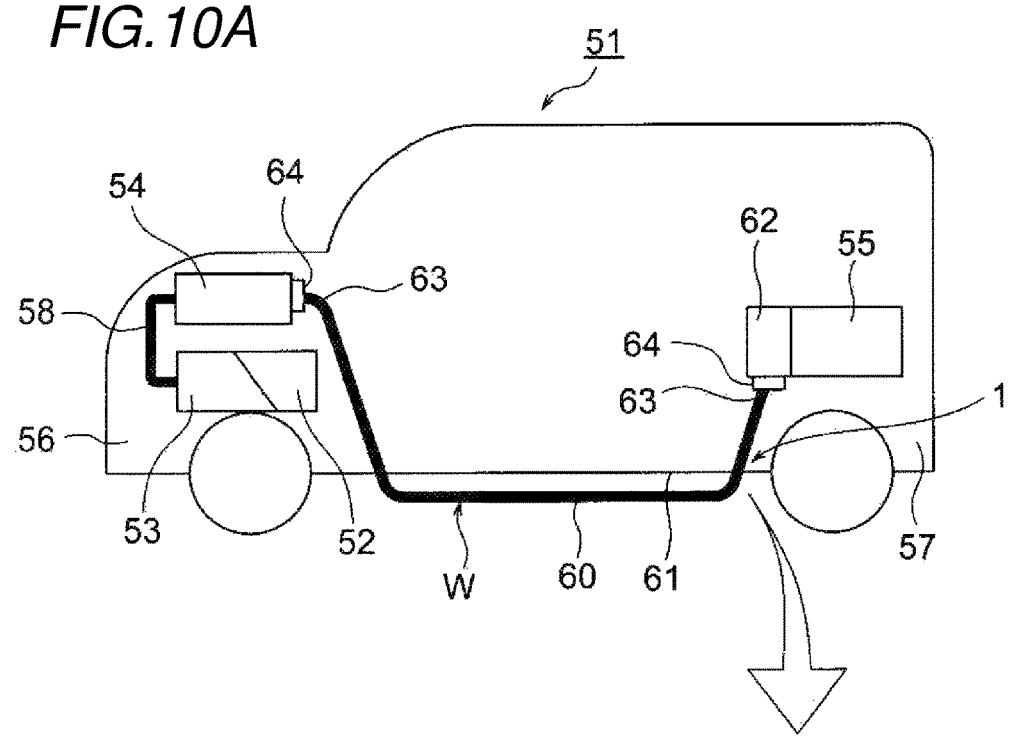
FIG. 10A is a schematic view illustrating a routing state of a wire harness of the present invention.
Figure 10B:
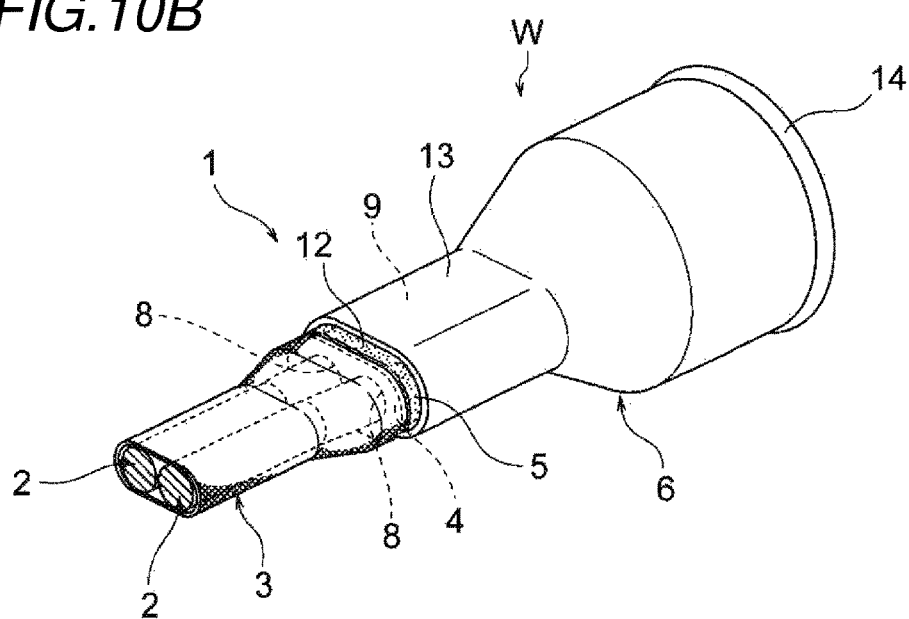
FIG. 10B is a schematic view illustrating a routing state of the wire harness of the present invention.

In FIG. 10A, reference sign 51 represents a hybrid vehicle. The hybrid vehicle 51 is a vehicle driven by driving power from a combination of two power sources, that is, an engine 52 and a motor unit 53. Electrical power is supplied from a battery 55 (battery cell pack) to the motor unit 53 via an inverter unit 54. In this example, the engine 52, the motor unit 53, and the inverter unit 54 are mounted in an engine compartment 56 in the vicinity of the front wheels and the like. The battery 55 is mounted in a vehicle rear portion 57 in the vicinity of the rear wheels and the like (the battery 55 may be mounted in a vehicle interior that is present on a rear side of the engine compartment 56).

The motor unit 53 is connected to the inverter unit 54 via a high-voltage wire harness 58. The battery 55 is connected to the inverter unit 54 via the high-voltage wire harness W. An intermediate portion 60 of the wire harness W is routed under a vehicle underfloor member 61 of the vehicle (a vehicle body). The intermediate portion 60 is routed substantially parallel to and along the vehicle underfloor member 61. The vehicle underfloor member 61 is a well-known body (vehicle body), and a so-called panel member. Through holes are respectively formed at predetermined positions in the vehicle underfloor member 61. The wire harness W is water-tightly inserted into the through holes.

The wire harness W is connected to the battery 55 via a junction block 62 provided in the battery 55. External connecting means such as a shielded connector 64 is provided at a harness end 63 on a rear end side of the wire harness W, and is electrically connected to the junction block 62. The wire harness W is electrically connected to the inverter unit 54 via the external connecting means such as the shielded connector 64 provided at the harness end 63 on a front end side of the wire harness W.

The waterproofing structure portion 1 of the present invention is disposed to align with the position of the through hole formed at the predetermined position in the vehicle underfloor member 61 (the position for the disposition is an example, and a waterproofing boot may be replaced with the waterproofing grommet 6, and the waterproofing structure portion 1 of the present invention may be disposed at the position of the harness end 63 on the rear end side of the wire harness W).

The present invention can be modified and embodied in various forms insofar as the modifications do not change the purport of the present invention.

The characteristics of the terminal inserting apparatus and the terminal inserting method in the aforementioned examples of the present invention are briefly described in [1] to [8] hereinbelow.

[1] A waterproofing structure includes one or multiple insulated core wires; a shielding member collectively covering the one or multiple insulated core wires; a sheath provided on an outside of the shielding member; and a waterproofing member provided on a target part of waterproofing. The target part of the waterproofing is formed at a portion in which a sheath end portion is formed by cutting away the sheath to a predetermined length, and the target part of the waterproofing is formed at a portion in which the shielding member is exposed from the sheath end portion. The waterproofing member is formed in a shape including a bottomed cylindrical body having a bottom portion and one or multiple tubular portions which open up the bottom portion and continue in an outer surface of the bottom portion. An inner circumferential surface of the body is formed at a portion which is in close contact with a first folded portion formed by folding the shielding member at a position of the sheath end portion. An outer circumferential surface of the body is formed at a portion which is covered with a second folded portion formed by folding the shielding member again at a position of an opening end portion of the body. The tubular portion is formed at a portion which is in close contact with an outer circumferential surface of an insulator of the one or multiple insulated core wires exposed by folding the shielding member.

[2] In the waterproofing structure described in [1], the body is formed so as to have elasticity generating an inward biasing force.

The waterproofing structure described in [1] and [2] is a structure in which the waterproofing member is provided on the target part of waterproofing on a sheathed conductive path (conductive path including one or multiple insulated core wires, a shielding member, and a sheath) so as to perform waterproofing. This waterproofing structure can reliably prevent the infiltration of water through a gap between the one or multiple insulated core wires and the shielding member. The reason for this is that the waterproofing member is shaped to include the bottomed cylindrical body including the bottom portion, and the one or multiple tubular portions which open up the bottom portion of the body and continues outward from the bottom portion. In addition, the shielding member exposed by cutting away a portion of the sheath is folded two times at the target part of waterproofing, thereby achieving waterproofing with no deterioration in shielding performance. In addition, the tubular portions of the waterproofing member are in close contact with the one or multiple insulated core wires, thereby achieving waterproofing. In addition, the body of the waterproofing member has elasticity, thereby achieving waterproofing. The waterproofing member is provided on the sheathed conductive path in the waterproofing structure, and thus the size of a portion, in which the waterproofing member is disposed, is not increased.

[3] A waterproofing method of a structure is provided with one or multiple insulated core wires; a shielding member collectively covering the one or multiple insulated core wires; a sheath provided on the outside of the shielding member; and a waterproofing member provided on a target part of waterproofing, in which the waterproofing member is shaped to include a bottomed cylindrical body including a bottom portion and one or multiple tubular portions which open up the bottom portion and continue in an outer surface of the bottom portion. In a first step, a sheath end portion is formed in the sheath by cutting away the sheath to a predetermined length which is up to the target part of waterproofing, and the shielding member is exposed from the sheath end portion. In a second step, a first folded portion is formed by folding the shielding member at the position of the sheath end portion. In a third step, the waterproofing member is assembled in such a way as to be aligned with the target part of waterproofing such that an inner circumferential surface of the body comes into close contact with the first folded portion. In a fourth step, a second folded portion is formed by folding the shielding member at the position of an opening end portion of the body again, and an outer surface side of the body is covered with the second folded portion.

According to the waterproofing method described in [3], the first to the fourth steps are sequentially performed, thereby forming a portion with the waterproofing structure (waterproofing structure portion). As a result, the target part of waterproofing on the sheathed conductive path can be reliably waterproofed.

[4] A wire harness routed in a vehicle and to perform electrical connection, in which a wire harness comprises a waterproofing structure portion, in which the waterproofing structure described in [1] or [2] is provided, at a harness end or a harness intermediate portion of the wire harness.

In the wire harness described in [4], the waterproofing structure portion is provided at the harness end or the harness intermediate portion. Since the waterproofing structure portion adopts the waterproofing structure described in [1] or [2], the same effects as those described in [1] or [2] can be obtained at the position of the waterproofing structure portion.

According to the waterproofing structure and the waterproofing method described in [1] to [3], the folded portion is formed by folding the shielding member at the sheath end portion, the waterproofing member is assembled to the folded portion, and the insulated core wires are respectively covered with the tubular portions of the waterproofing member. Therefore, the infiltration of water through the gap between the insulated core wires and the shielding member can be prevented. Accordingly, waterproofing at a predetermined position can be reliably achieved. Since the waterproofing member is provided, the waterproofing structure does not require an exterior member. As a result, waterproofing can be achieved with no increase in size.

Since the wire harness described in [4] includes the waterproofing structure portion which adopts the waterproofing structure described in [1] or [2], reliable waterproofing at a predetermined position can be achieved with no increase in size, and it is possible to provide an improved wire harness.

[5] A waterproofing structure includes multiple conductive paths; a cylindrical conductive shielding member configured to collectively cover the multiple conductive paths; and first waterproofing means, second waterproofing means, and third waterproofing means which are disposed sequentially from the inside at a target part of waterproofing. The shielding member is formed to include substantially gap-like inner-to-outer surface communication portions through which an inner surface and an outer surface of the shielding member communicate with each other. The first waterproofing means is formed to include a foundation portion formed as an external portion of the first waterproofing means, and conductive path close-contact portions which respectively come into close contact with the multiple conductive paths, and is inserted into or mounted on an inner surface side of the shielding member. The second waterproofing means is provided on the outer surface of the shielding member, comes into close contact with the outer surface, fills up the inner-to-outer surface communication portions, and forms a waterproofing means outer surface on an outer surface side of the shielding member. The third waterproofing means is formed into a cylindrical shape, and includes a fixed portion fixed to a mating member, and an elastic close-contact portion which comes into close contact with the waterproofing means outer surface of the second waterproofing means from the outside of the second waterproofing means. The foundation portion is formed as a portion which receives and comes into close contact with the inner surface of the shielding member, and comes into close contact with the second waterproofing means filling up the inner-to-outer communication portions.

In the waterproofing structure described in [5], the first waterproofing means is disposed at the target part of waterproofing on the multiple conductive paths. A gap between the multiple conductive paths is filled up and waterproofed by the first waterproofing means. The conductive paths are respectively waterproofed by the conductive path close-contact portions formed in the first waterproofing means. The first waterproofing means includes the foundation portion as an external portion, and the foundation portion serves to receive and come into close contact with the inner surface of the shielding member. When the first waterproofing means is disposed at the target part of waterproofing on the multiple conductive paths, the first waterproofing means is positioned between the multiple conductive paths and the shielding member collectively covering the multiple conductive paths.

The shielding member, which is provided with substantially gap-like inner-to-outer surface communication portions through which the inner surface and the outer surface communicated with each other, is adopted. Accordingly, typical metal foil, a typical metal pipe, or the like is not adopted as the shielding member. The braid described in [6] is the most suitable for the shielding member. The first waterproofing means with the aforementioned functions is adopted. Accordingly, the first waterproofing means not serving as the receiving portion and the close-contact portion, in other words, the first waterproofing means not serving as a foundation (base) is not adopted in the present invention. When the first waterproofing means serves as a foundation (base), even if an adhesive is adopted as the second waterproofing means, the first waterproofing means is capable of stabilize the shape of the adhesive after being hardened.

The second waterproofing means is disposed on the outer surface of the shielding member in such a way as to be aligned with the target part of waterproofing. The inner-to-outer surface communication portions formed in the shielding member are filled up and waterproofed by the second waterproofing means. The second waterproofing means fills up the inner-to-outer surface communication portions, and comes into close contact with the foundation portion of the first waterproofing means positioned on the inner surface side of the shielding member. As a result, a state in which the shielding member is received (placed on) by the foundation portion is changed to a state in which the shielding member comes into close contact with the foundation portion. That is, the gap between the shielding member and the multiple conductive paths is waterproofed by the first waterproofing means and the second waterproofing means. After the second waterproofing means is provide on the outer surface of the shielding member, the waterproofing means outer surface is formed on an outer surface side of the second waterproofing means. The first waterproofing means, which has the aforementioned functions, and with which the second waterproofing means comes into close contact, is adopted.

The third waterproofing means is disposed in such a way as to be aligned with the target part of waterproofing. The third waterproofing means comes into close contact with the waterproofing means outer surface which is formed on the outer surface side of the shielding member by the second waterproofing means. The shielding member is also waterproofed by the third waterproofing means.

[6] In the waterproofing structure described in [5], the shielding member is a braid in which metal threads are woven together, and the inner-to-outer surface communication portions are braided meshes of the braid.

In the waterproofing structure described in [6], a braid is adopted as the shielding member. When the second waterproofing means is provided on an outer surface of the braid, the second waterproofing means fills up the braided meshes of the braid, and comes into close contact with the foundation portion of the first waterproofing means. Accordingly, a gap between the braid and the multiple conductive paths is waterproofed by the first waterproofing means and the second waterproofing means.

[7] In a wire harness which is routed in a vehicle and through which electrical connection is formed, a waterproofing structure portion, which adopts the waterproofing structure described in [5] or [6], is provided at a harness end or a harness intermediate portion of the wire harness.

In the wire harness described in [7], the waterproofing structure portion is provided at the harness end or the harness intermediate portion. Since the waterproofing structure adopts the waterproofing structure described in [5] or [6], the same effects as those described in [5] or [6] can be obtained at the position of the waterproofing structure portion.

[8] There is provided a waterproofing method of a structure including multiple conductive paths; a cylindrical conductive braid configured to collectively cover the multiple conductive paths; a waterproofing plug which includes a foundation portion and a conductive path close-contact portion, and fills up a gap between the multiple conductive paths; a waterproofing adhesive member filling up braided meshes of the braid; and a cylindrical waterproofing grommet or a cylindrical waterproofing boot including an elastic close-contact portion. In a first step, the braid is rolled up in such a way as to be aligned with a target part of waterproofing, and the waterproofing plug is assembled to the multiple conductive paths. In a second step, the rolled-up braid is unrolled to cover both the multiple conductive paths and the waterproofing plug. In a third step, the waterproofing adhesive member is provided on an outer surface of the braid in such a way as to be aligned with the target part of waterproofing, fills up the braided meshes, and comes into close contact with the foundation portion, and an inner surface of the braid together with the waterproofing adhesive member comes into close contact with the foundation portion. In a fourth step, the waterproofing adhesive member is hardened, and the elastic close-contact portion comes into close contact with a waterproofing means outer surface formed on an outer surface side of the braid.

In the first step of the waterproofing method described in [8], the braid is rolled up in such a way as to be aligned with the target part of waterproofing. When this operation is performed, the multiple conductive paths are exposed up to the target part of waterproofing. When the waterproofing plug is assembled to the multiple exposed conductive paths, the gap between the multiple conductive paths is filled up by the waterproofing plug. That is, the gap between the conductive paths is waterproofed by the waterproofing plug. When the waterproofing plug is assembled thereto, the multiple conductive paths are respectively waterproofed by the conductive path close-contact portions formed in the waterproofing plug.

In the second step, the braid rolled up in the first step is restored to its original state. When this operation is performed, and the braid is restored to its original state, the waterproofing plug together with the multiple conductive paths is covered with the braid.

In the third step, the waterproofing adhesive member is provided on the outer surface of the braid in such a way as to be aligned with the target part of waterproofing. When a type of waterproofing adhesive member, which is melted by heat and then is hardened, is used, the waterproofing adhesive member infiltrates into and fills up the braided meshes of the braid, and reaches the foundation portion of the waterproofing plug. Thereafter, when the waterproofing adhesive member is hardened, the hardened waterproofing adhesive member completely comes into close contact with the foundation portion. At this time, the inner surface of the braid also comes into close contact with the foundation portion along with the waterproofing adhesive member. When the waterproofing adhesive member is hardened, the waterproofing means outer surface is formed on the outer surface side of the braid (when the waterproofing adhesive member is configured such that an adhesive is provided on a tube base material or a tape base material, an outer surface of the base material may serve as the waterproofing means outer surface).

In the fourth step, the elastic close-contact portion of the waterproofing grommet or the waterproofing boot is brought into close contact with the waterproofing means outer surface formed on the outer surface side of the braid by the hardening of the waterproofing adhesive member. When this operation is performed, the braid is also waterproofed by the waterproofing grommet or the waterproofing boot.

According to [5] and [6], it is possible to provide the waterproofing structure capable of reliably performing waterproofing at a predetermined position. According to [7], since a wire harness includes the waterproofing structure portion which adopts the waterproofing structure described in [5] or [6], it is possible to provide the wire harness capable of reliably performing waterproofing at the predetermined position. That is, it is possible to provide an improved wire harness. According to [8], it is possible to provide the waterproofing method by which reliable waterproofing can be achieved at a predetermined position.

REFERENCE SIGNS LIST

W: WIRE HARNESS
1: WATERPROOFING STRUCTURE PORTION
2: CONDUCTIVE PATH
3: BRAID (SHIELDING MEMBER)
4: WATERPROOFING PLUG (FIRST WATERPROOFING MEANS)
5: WATERPROOFING ADHESIVE MEMBER (SECOND WATERPROOFING MEANS)
6: WATERPROOFING GROMMET (THIRD WATERPROOFING MEANS)
7: BRAIDED MESH (INNER-TO-OUTER SURFACE COMMUNICATION PORTION)
8: CONDUCTIVE PATH CLOSE-CONTACT PORTION
9: FOUNDATION PORTION
10: OUTER CIRCUMFERENTIAL SURFACE
11: RIB
12: WATERPROOFING MEANS OUTER SURFACE
13: ELASTIC CLOSE-CONTACT PORTION
14: FIXED PORTION
51: HYBRID VEHICLE (VEHICLE)
52: ENGINE

53: MOTOR UNIT
54: INVERTER UNIT
55: BATTERY
56: ENGINE COMPARTMENT
57: VEHICLE REAR PORTION
58: WIRE HARNESS
60: INTERMEDIATE PORTION
61: VEHICLE UNDERFLOOR MEMBER
62: JUNCTION BLOCK
63: HARNESS END
64: SHIELDED CONNECTOR
101: WATERPROOFING STRUCTURE PORTION
102: SHEATHED CONDUCTIVE PATH
103: WATERPROOFING BOOT (WATERPROOFING MEMBER)
104: INSULATED CORE WIRE
105: BRAID (SHIELDING MEMBER)
106: SHEATH
107: BODY
108: TUBULAR PORTION
109: BOTTOM PORTION
110: CYLINDRICAL PORTION
111: OPENING END PORTION
112: SHEATH END PORTION
113: FIRST FOLDED PORTION
114: SECOND FOLDED PORTION
151: HYBRID VEHICLE (VEHICLE)
152: ENGINE
153: MOTOR UNIT
154: INVERTER UNIT
155: BATTERY
156: ENGINE COMPARTMENT
157: VEHICLE REAR PORTION
158: WIRE HARNESS
160: INTERMEDIATE PORTION
161: VEHICLE UNDERFLOOR MEMBER
162: JUNCTION BLOCK
163: HARNESS END
164: SHIELDED CONNECTOR

What is claimed is:

1. A waterproofing structure comprising:
one or multiple insulated core wires;
a shielding member collectively covering the one or multiple insulated core wires;
a sheath provided on an outside of the shielding member; and
a waterproofing member provided on a target part of waterproofing,
wherein the target part of the waterproofing is formed at a portion in which a sheath end portion is formed by cutting away the sheath to a predetermined length, and the target part of the waterproofing is formed at a portion in which the shielding member is exposed from the sheath end portion,
wherein the waterproofing member is formed in a shape including a bottomed cylindrical body having a bottom portion and one or multiple tubular portions which open up the bottom portion and continue in an outer surface of the bottom portion,
wherein an inner circumferential surface of the body is formed at a portion which is in close contact with a first folded portion formed by folding the shielding member at a position of the sheath end portion,
wherein an outer circumferential surface side of the body is formed at a portion which is covered with a second folded portion formed by folding the shielding member again at a position of an opening end portion of the body, and
wherein the tubular portion is formed at a portion which is in close contact with an outer circumferential surface of an insulator of the one or multiple insulated core wires exposed by folding the shielding member.

2. The waterproofing structure according to claim 1, wherein the body is formed so as to have elasticity generating an inward biasing force.

3. A waterproofing method in a structure including one or multiple insulated core wires, a shielding member collectively covering the one or multiple insulated core wires, a sheath provided on an outside of the shielding member and a waterproofing member provided at a target part of waterproofing, in which the waterproofing member is formed in a shape including a bottomed cylindrical body having a bottom portion and one or multiple tubular portions which open up the bottom portion and continue in an outer surface of the bottom portion, the waterproofing method comprising:
forming a sheath end portion in the sheath by cutting away the sheath to a predetermined length which is up to the target part of waterproofing, and exposing the shielding member from the sheath end portion,
forming a first folded portion by folding the shielding member at the position of the sheath end portion,
assembling the waterproofing member so as to be aligned with the target part so that an inner circumferential surface of the body comes into close contact with the first folded portion, and
forming a second folded portion by folding the shielding member again at a position of an opening end portion of the body, and covering an outer surface side of the body with the second folded portion.

4. A wire harness routed in a vehicle to perform electrical connection,
wherein the wire harness comprises a waterproofing structure portion, in which the waterproofing structure according to claim 1 is provided, at a harness end or a harness intermediate portion of the wire harness.

5. A wire harness routed in a vehicle to perform electrical connection,
wherein the wire harness comprises a waterproofing structure portion, in which the waterproofing structure according to claim 2 is provided, at a harness end or a harness intermediate portion of the wire harness.

* * * * *